United States Patent
Xu et al.

(10) Patent No.: US 11,115,911 B2
(45) Date of Patent: *Sep. 7, 2021

(54) REUSE OF CONTROL CHANNEL RESOURCE ASSOCIATED WITH INITIAL ACCESS

(71) Applicant: QUALCOMM Incorporated, San Diego, CA (US)

(72) Inventors: Huilin Xu, San Diego, CA (US); Prashanth Haridas Hande, San Diego, CA (US); Heechoon Lee, San Diego, CA (US); Peter Pui Lok Ang, San Diego, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,577

(22) Filed: Sep. 11, 2019

(65) Prior Publication Data

US 2020/0092799 A1    Mar. 19, 2020

Related U.S. Application Data

(60) Provisional application No. 62/731,470, filed on Sep. 14, 2018.

(51) Int. Cl.
*H04W 48/16* (2009.01)
*H04W 24/08* (2009.01)
(Continued)

(52) U.S. Cl.
CPC ........... *H04W 48/16* (2013.01); *H04L 5/0094* (2013.01); *H04W 24/08* (2013.01); *H04W 72/0453* (2013.01)

(58) Field of Classification Search
CPC ... H04L 5/0092; H04L 5/0094; H04L 5/0064; H04L 5/001; H04L 5/0053; H04L 5/008;
(Continued)

(56) References Cited

U.S. PATENT DOCUMENTS

2017/0339677 A1* 11/2017 Rico Alvarino ...... H04L 5/0094
2020/0021407 A1*  1/2020 Abdoli .................... H04L 5/001

OTHER PUBLICATIONS

Huawei et al., "SI Reception for Connected UE in BWP", 3GPP TSG RAN2 Meeting #101,3GPP Draft; R2-1801819 SI Reception for Connected UE in BWP, 3rd Generation Partnership Project, Mobile Competence Centre; 650, Route Des Lucioles; F-06921 Sophia-Antipolis Cedex; France, vol. Ran WG2, No. Athens, GR; Feb. 26, 2018.*

(Continued)

*Primary Examiner* — Yemane Mesfin
*Assistant Examiner* — Henry Baron
(74) *Attorney, Agent, or Firm* — Holland & Hart LLP/Qualcomm

(57) ABSTRACT

Methods, systems, and devices for wireless communications are described. A user equipment (UE) may obtain access to a base station by performing an initial access procedure within an initial access bandwidth that contains control channel resources. The UE may receive a configuration of a downlink bandwidth part (BWP) following the initial access procedure, and may determine that the downlink BWP fully contains the initial access bandwidth. In some cases, the UE may make the determination based on an indication sent from the base station. For instance, the indication may be provided as part of one or more control channel configurations transmitted to the UE. Based on determining that the downlink BWP fully contains the initial access bandwidth, the UE may monitor for control information in the downlink BWP using control channel resources in the downlink BWP (Continued)

that correspond to control channel resources used in the initial access bandwidth.

30 Claims, 16 Drawing Sheets

(51) Int. Cl.
 *H04W 72/04* (2009.01)
 *H04L 5/00* (2006.01)
(58) Field of Classification Search
 CPC ... H04W 48/12; H04W 48/16; H04W 74/006; H04W 24/08; H04W 72/0453
 See application file for complete search history.

(56) References Cited

OTHER PUBLICATIONS

Huawei et al., "SI Reception for Connected UE in BWP", 3GPP TSG RAN2 Meeting #101, 3GPP Draft; R2-1801819 SI Reception for Connected UE in BWP, 3rd Generation Partnership Project (3GPP), Mobile Competence Centre; 650, Route Des Lucioles; F-06921 Sophia-Antipolis Cedex; France, vol. Ran WG2, No. Athens, GR; Feb. 26, 2018-Mar. 2, 2018, Feb. 16, 2018 (Feb. 16, 2018), 4 Pages, XP051400055, Retrieved from the Internet: URL: http://www.3gpp.org/ftp/tsg%5Fran/WG2%5FRL2/TSGR2%5F101/Docs/ [retrieved on Feb. 16, 2018].

Intel Corporation: "SI Reception in Connected Mode", 3GPP TSG RAN WG2 NR Meeting #102, 3GPP Draft; R2-1807353-DEDICATEDSIG_V03, 3rd Generation Partnership Project (3GPP), Mobile Competence Centre, 650, Route Des Lucioles, F-06921 Sophia-Anti Polis Cedex, France, vol. RAN WG2, No. Susan, Korea; May 21, 2018-May 25, 2018, May 20, 2018 (May 20, 2018), 4 Pages, XP051443756, Retrieved from the Internet: URL: http://www.3gpp.org/ftp/Meetings%5F3GPP%5FSYNC/RAN2/Docs/ [retrieved on May 20, 2018].

International Search Report and Written Opinion—PCT/US2019/050761—ISA/EPO—dated Nov. 21, 2019.

NTT Docomo et al: "Offline Summary for AI 7.3.1.2 Remaining Details on Search Space," 3GPP TSG RAN WG1 Meeting # 91,3GPP Draft; R1-1721414, 3rd Generation Partnership Project (3GPP), Mobile Competence Centre; 650, Route Des Lucioles; F-06921 Sophia-Antipolis Cedex, France, vol. RAN WG1, No. Reno, USA; Nov. 27, 2017-Dec. 1, 2017, Nov. 28, 2017 (Nov. 28, 2017), XP051363871, pp. 1-24, Retrieved from the Internet: URL:http://www.3gpp.org/ftp/Meetings_3GPP_SYNC/RAN1/Docs/[retrieved on Nov. 28, 2017], Section 1.2 and 1.4.

* cited by examiner

REUSE OF CONTROL CHANNEL RESOURCE ASSOCIATED WITH INITIAL ACCESS

CROSS REFERENCE

The present application for patent claims the benefit of U.S. Provisional Patent Application No. 62/731,470 by Xu et al. entitled "REUSE OF CONTROL CHANNEL RESOURCE ASSOCIATED WITH INITIAL ACCESS," filed Sep. 14, 2018, assigned to the assignee hereof, and expressly incorporated by reference in its entirety.

FIELD OF TECHNOLOGY

The following relates generally to wireless communications, and more specifically to reuse of control channel resource associated with initial access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UEs). In some cases, a UE may monitor different bandwidths or bandwidth parts (BWPs) for downlink channel information from a base station. For example, the UE may be configured to monitor an initial access bandwidth when attempting to establish communications with the base station. After initial access, the UE may then be configured to monitor one or more additional bandwidths or BWPs which may be distinct from the initial access bandwidth. Accordingly, the UE may monitor for the downlink channel information to identify one or more common search spaces within the initial access bandwidth and/or one or more BWPs. However, monitoring for and processing the downlink channel information in various BWPs may result in additional computational processing at the UE, resulting in inefficient communications between the UE and base station.

SUMMARY

The described techniques relate to improved methods, systems, devices, and apparatuses that support reuse of control channel resource associated with initial access. Generally, the described techniques provide for enabling a user equipment (UE) and a network to reuse control channel resources from an initial access bandwidth in a downlink bandwidth part (BWP). In some examples, the UE may obtain access to a cell provided by a base station through performing an initial access procedure within a bandwidth configured for initial access (e.g., an initial access bandwidth). In some cases, the UE may receive signaling that specifies control resources associated with the initial access bandwidth (e.g., a control resource set (CORESET) and/or a control channel search space). After the initial access procedure, the UE may be configured with a downlink BWP, and may determine whether the downlink BWP includes the initial access bandwidth. For instance, the UE may determine whether the initial access bandwidth is fully contained in the downlink BWP, where the downlink BWP may include the same time/frequency resources as the initial access bandwidth, and may also have a same subcarrier spacing as the initial access bandwidth.

In some examples, the UE may independently determine whether the downlink BWP includes the initial access bandwidth. Additionally or alternatively, the UE may receive explicit signaling (e.g., radio resource control (RRC) signaling) from the network indicating that the downlink BWP fully contains the initial access bandwidth. In some cases, the indication may include a configuration for the downlink BWP having information associated with control channel resources unique to the initial access bandwidth. The configuration may enable the UE to determine that the downlink BWP fully contains the initial access bandwidth. The base station may transmit control information within the downlink BWP using the control channel resources associated with the initial access bandwidth, where the UE may monitor for the control information based on determining that the initial access bandwidth is included in the downlink BWP.

A method of wireless communication by a UE is described. The method may include performing an initial access procedure within an initial access bandwidth to obtain access to a cell, the initial access bandwidth including first control channel resources, receiving, after the initial access procedure, a configuration of a downlink bandwidth part for communicating with the cell, determining whether the downlink bandwidth part includes the initial access bandwidth, and monitoring for control information within the downlink bandwidth part using second control channel resources that correspond to the first control channel resources, where the monitoring is based on a determination that the downlink bandwidth part contains the initial access bandwidth.

An apparatus for wireless communication by a UE is described. The apparatus may include a processor, memory in electronic communication with the processor, and instructions stored in the memory. The instructions may be executable by the processor to cause the apparatus to perform an initial access procedure within an initial access bandwidth to obtain access to a cell, the initial access bandwidth including first control channel resources, receive, after the initial access procedure, a configuration of a downlink bandwidth part for communicating with the cell, determine whether the downlink bandwidth part includes the initial access bandwidth, and monitor for control information within the downlink bandwidth part using second control channel resources that correspond to the first control channel resources, where the monitoring is based on a determination that the downlink bandwidth part contains the initial access bandwidth.

Another apparatus for wireless communication by a UE is described. The apparatus may include means for performing an initial access procedure within an initial access bandwidth to obtain access to a cell, the initial access bandwidth including first control channel resources, receiving, after the initial access procedure, a configuration of a downlink bandwidth part for communicating with the cell, determining whether the downlink bandwidth part includes the initial access bandwidth, and monitoring for control information within the downlink bandwidth part using second control channel resources that correspond to the first control channel resources, where the monitoring is based on a determination that the downlink bandwidth part contains the initial access bandwidth.

A non-transitory computer-readable medium storing code for wireless communication by a UE is described. The code may include instructions executable by a processor to perform an initial access procedure within an initial access bandwidth to obtain access to a cell, the initial access bandwidth including first control channel resources, receive, after the initial access procedure, a configuration of a downlink bandwidth part for communicating with the cell, determine whether the downlink bandwidth part includes the initial access bandwidth, and monitor for control information within the downlink bandwidth part using second control channel resources that correspond to the first control channel resources, where the monitoring is based on a determination that the downlink bandwidth part contains the initial access bandwidth.

In some examples of the method, apparatuses, and non-transitory computer-readable medium described herein, determining that the downlink bandwidth part includes the initial access bandwidth may include operations, features, means, or instructions for receiving an indication that the downlink bandwidth part includes the initial access bandwidth, the indication including a control channel configuration for the second control channel resources that may be associated with the first control channel resources.

Some examples of the method, apparatuses, and non-transitory computer-readable medium described herein may further include operations, features, means, or instructions for identifying, within the control channel configuration, at least one common search space identity that indicates one or more control channel search spaces of the second control channel resources may be associated with a control channel search space of the first control channel resources.

In some examples of the method, apparatuses, and non-transitory computer-readable medium described herein, the control channel configuration includes a cell-specific control channel configuration for the second control channel resources. In some examples of the method, apparatuses, and non-transitory computer-readable medium described herein, the at least one common search space identity corresponds to a common control channel search space that may be used to convey a system information block, other system information, page information, random access information, or any combination thereof.

Some examples of the method, apparatuses, and non-transitory computer-readable medium described herein may further include operations, features, means, or instructions for receiving a master information block and determining time domain and frequency domain information of the second control channel resources based on the received master information block.

Some examples of the method, apparatuses, and non-transitory computer-readable medium described herein may further include operations, features, means, or instructions for receiving, within the initial access bandwidth, a cell-specific control channel configuration and a UE-specific control channel configuration and determining time domain and frequency domain information of the second control channel resources based on the cell-specific control channel configuration or the UE-specific control channel configuration, or both.

Some examples of the method, apparatuses, and non-transitory computer-readable medium described herein may further include operations, features, means, or instructions for identifying, within the control channel configuration, a search space field, or a control resource set field, or a combination thereof, that indicates a control channel search space and a control resource set of the second control channel resources may be associated with a control channel search space or a control resource set of the first control channel resources.

In some examples of the method, apparatuses, and non-transitory computer-readable medium described herein, the control channel configuration includes a cell-specific control channel configuration for the second control channel resources. Some examples of the method, apparatuses, and non-transitory computer-readable medium described herein may further include operations, features, means, or instructions for receiving a master information block and determining time domain and frequency domain information of the second control channel resources based on the master information block, where the search space field or the control resource set field include information that may be consistent with information configured by the master information block.

Some examples of the method, apparatuses, and non-transitory computer-readable medium described herein may further include operations, features, means, or instructions for receiving, within the initial access bandwidth, a cell-specific control channel configuration and a UE-specific control channel configuration and determining time domain and frequency domain information of the second control channel resources based on the cell-specific control channel configuration or the UE-specific control channel configuration, or both.

Some examples of the method, apparatuses, and non-transitory computer-readable medium described herein may further include operations, features, means, or instructions for identifying, within the control channel configuration, a search space configuration that indicates a control channel search space, or a control resource set, or both, of the second control channel resources may be associated with the first control channel resources. In some examples of the method, apparatuses, and non-transitory computer-readable medium described herein, the control channel configuration includes a UE-specific control channel configuration for the second control channel resources.

Some examples of the method, apparatuses, and non-transitory computer-readable medium described herein may further include operations, features, means, or instructions for identifying a set of parameters for the second control channel resources using the search space configuration, where the set of parameters includes a search space periodicity, a slot offset, a starting symbol period (or bitmap) of a control channel search space, an aggregation level, or any combination thereof.

Some examples of the method, apparatuses, and non-transitory computer-readable medium described herein may further include operations, features, means, or instructions for receiving a master information block and determining time domain and frequency domain information of the second control channel resources, or a set of parameters of the second control channel resources, or a combination thereof, based on the received master information block.

Some examples of the method, apparatuses, and non-transitory computer-readable medium described herein may further include operations, features, means, or instructions for receiving, within the initial access bandwidth, a cell-specific control channel configuration and a UE-specific control channel configuration and determining time domain and frequency domain information of the second control channel resources, or a set of parameters of the second control channel resources, or a combination thereof, based on the cell-specific control channel configuration or the UE-specific control channel configuration, or both.

Some examples of the method, apparatuses, and non-transitory computer-readable medium described herein may further include operations, features, means, or instructions for identifying, within the control channel configuration, a common search space identity, a search space field, a control resource set field, a search space configuration, or a combination thereof, that indicates the second control channel resources may be associated with the first control channel resources.

In some examples of the method, apparatuses, and non-transitory computer-readable medium described herein, the control channel configuration includes a cell-specific control channel configuration or a UE-specific control channel configuration for the second control channel resources.

Some examples of the method, apparatuses, and non-transitory computer-readable medium described herein may further include operations, features, means, or instructions for receiving the control channel configuration via radio resource control signaling. In some examples of the method, apparatuses, and non-transitory computer-readable medium described herein, the initial access bandwidth and the downlink bandwidth part may have a same subcarrier spacing.

In some examples of the method, apparatuses, and non-transitory computer-readable medium described herein, the second control channel resources include one or more control resource sets, one or more control channel search spaces, or a combination thereof. In some examples of the method, apparatuses, and non-transitory computer-readable medium described herein, at least one of the one or more control resource sets or at least one of the one or more control channel search spaces may be used to convey a system information block, other system information, page information, random access information, or a combination thereof.

A method of wireless communication by a base station is described. The method may include performing an initial access procedure within an initial access bandwidth to provide a UE access to a cell of the base station, the initial access bandwidth including first control channel resources, transmitting, after the initial access procedure, a configuration of a downlink bandwidth part for communicating with the UE, transmitting an indication that the downlink bandwidth part includes the initial access bandwidth, and transmitting control information within the downlink bandwidth part using second control channel resources that correspond to the first control channel resources, where the transmitting is based on the downlink bandwidth part including the initial access bandwidth.

An apparatus for wireless communication by a base station is described. The apparatus may include a processor, memory in electronic communication with the processor, and instructions stored in the memory. The instructions may be executable by the processor to cause the apparatus to perform an initial access procedure within an initial access bandwidth to provide a UE access to a cell of the base station, the initial access bandwidth including first control channel resources, transmit, after the initial access procedure, a configuration of a downlink bandwidth part for communicating with the UE, transmit an indication that the downlink bandwidth part includes the initial access bandwidth, and transmit control information within the downlink bandwidth part using second control channel resources that correspond to the first control channel resources, where the transmitting is based on the downlink bandwidth part including the initial access bandwidth.

Another apparatus for wireless communication by a base station is described. The apparatus may include means for performing an initial access procedure within an initial access bandwidth to provide a UE access to a cell of the base station, the initial access bandwidth including first control channel resources, transmitting, after the initial access procedure, a configuration of a downlink bandwidth part for communicating with the UE, transmitting an indication that the downlink bandwidth part includes the initial access bandwidth, and transmitting control information within the downlink bandwidth part using second control channel resources that correspond to the first control channel resources, where the transmitting is based on the downlink bandwidth part including the initial access bandwidth.

A non-transitory computer-readable medium storing code for wireless communication by a base station is described. The code may include instructions executable by a processor to perform an initial access procedure within an initial access bandwidth to provide a UE access to a cell of the base station, the initial access bandwidth including first control channel resources, transmit, after the initial access procedure, a configuration of a downlink bandwidth part for communicating with the UE, transmit an indication that the downlink bandwidth part includes the initial access bandwidth, and transmit control information within the downlink bandwidth part using second control channel resources that correspond to the first control channel resources, where the transmitting is based on the downlink bandwidth part including the initial access bandwidth.

In some examples of the method, apparatuses, and non-transitory computer-readable medium described herein, the indication that the downlink bandwidth part includes the initial access bandwidth includes a control channel configuration for the second control channel resources that may be associated with the first control channel resources.

Some examples of the method, apparatuses, and non-transitory computer-readable medium described herein may further include operations, features, means, or instructions for configuring, within the control channel configuration, at least one common search space identity that indicates one or more control channel search spaces of the second control channel resources may be associated with a control channel search space of the first control channel resources. In some examples of the method, apparatuses, and non-transitory computer-readable medium described herein, the control channel configuration includes a cell-specific control channel configuration for the second control channel resources.

In some examples of the method, apparatuses, and non-transitory computer-readable medium described herein, the at least one common search space identity corresponds to a common search space that may be used to convey a system information block, other system information, page information, random access information, or any combination thereof.

Some examples of the method, apparatuses, and non-transitory computer-readable medium described herein may further include operations, features, means, or instructions for transmitting a master information block that indicates time domain and frequency domain information of the second control channel resources.

Some examples of the method, apparatuses, and non-transitory computer-readable medium described herein may further include operations, features, means, or instructions for transmitting, within the initial access bandwidth, a cell-specific control channel configuration and a UE-specific control channel configuration, where the cell-specific control channel configuration or the UE-specific control channel configuration, or both, indicate time domain and frequency domain information of the second control channel resources.

Some examples of the method, apparatuses, and non-transitory computer-readable medium described herein may further include operations, features, means, or instructions for configuring, within the control channel configuration, a search space field, or a control resource set field, or a combination thereof, that indicates a control channel search space and a control resource set of the second control channel resources may be associated with a control channel search space or a control resource set of the first control channel resources.

In some examples of the method, apparatuses, and non-transitory computer-readable medium described herein, the control channel configuration includes a cell-specific control channel configuration for the second control channel resources. Some examples of the method, apparatuses, and non-transitory computer-readable medium described herein may further include operations, features, means, or instructions for transmitting a master information block that indicates time domain and frequency domain information of the second control channel resources, where the search space field or the control resource set field include information that may be consistent with information configured by the master information block.

Some examples of the method, apparatuses, and non-transitory computer-readable medium described herein may further include operations, features, means, or instructions for transmitting, within the initial access bandwidth, a cell-specific control channel configuration and a UE-specific control channel configuration, where the cell-specific control channel configuration or the UE-specific control channel configuration, or both, indicate time domain and frequency domain information of the second control channel resources.

Some examples of the method, apparatuses, and non-transitory computer-readable medium described herein may further include operations, features, means, or instructions for configuring, within the control channel configuration, a search space configuration that indicates a control channel search space, or a control resource set, or both, of the second control channel resources may be associated with the first control channel resources. In some examples of the method, apparatuses, and non-transitory computer-readable medium described herein, the control channel configuration includes a UE-specific control channel configuration for the second control channel resources.

Some examples of the method, apparatuses, and non-transitory computer-readable medium described herein may further include operations, features, means, or instructions for configuring, within the search space configuration, a set of parameters for the second control channel resources, where the set of parameters includes a search space periodicity, a slot offset, a starting bitmap of a control channel search space, an aggregation level, or any combination thereof.

Some examples of the method, apparatuses, and non-transitory computer-readable medium described herein may further include operations, features, means, or instructions for transmitting a master information block that indicates time domain and frequency domain information of the second control channel resources, or a set of parameters of the second control channel resources, or a combination thereof.

Some examples of the method, apparatuses, and non-transitory computer-readable medium described herein may further include operations, features, means, or instructions for transmitting, within the initial access bandwidth, a cell-specific control channel configuration and a UE-specific control channel configuration, where the cell-specific control channel configuration or the UE-specific control channel configuration, or both, indicate time domain and frequency domain information of the second control channel resources, or a set of parameters of the second control channel resources, or a combination thereof.

Some examples of the method, apparatuses, and non-transitory computer-readable medium described herein may further include operations, features, means, or instructions for configuring, within the control channel configuration, a common search space identity, a search space field, a control resource set field, a search space configuration, or a combination thereof, that indicates the second control channel resources may be associated with the first control channel resources.

In some examples of the method, apparatuses, and non-transitory computer-readable medium described herein, the control channel configuration includes a cell-specific control channel configuration or a UE-specific control channel configuration for the second control channel resources. Some examples of the method, apparatuses, and non-transitory computer-readable medium described herein may further include operations, features, means, or instructions for transmitting the control channel configuration via radio resource control signaling.

In some examples of the method, apparatuses, and non-transitory computer-readable medium described herein, the initial access bandwidth and the downlink bandwidth part may have a same subcarrier spacing. In some examples of the method, apparatuses, and non-transitory computer-readable medium described herein, the second control channel resources include one or more control resource sets, one or more control channel search spaces, or a combination thereof.

In some examples of the method, apparatuses, and non-transitory computer-readable medium described herein, at least one of the one or more control resource sets or at least one of the one or more control channel search spaces may be used to convey a system information block, other system information, page information, random access information, or a combination thereof.

DETAILED DESCRIPTION

Figure 1:
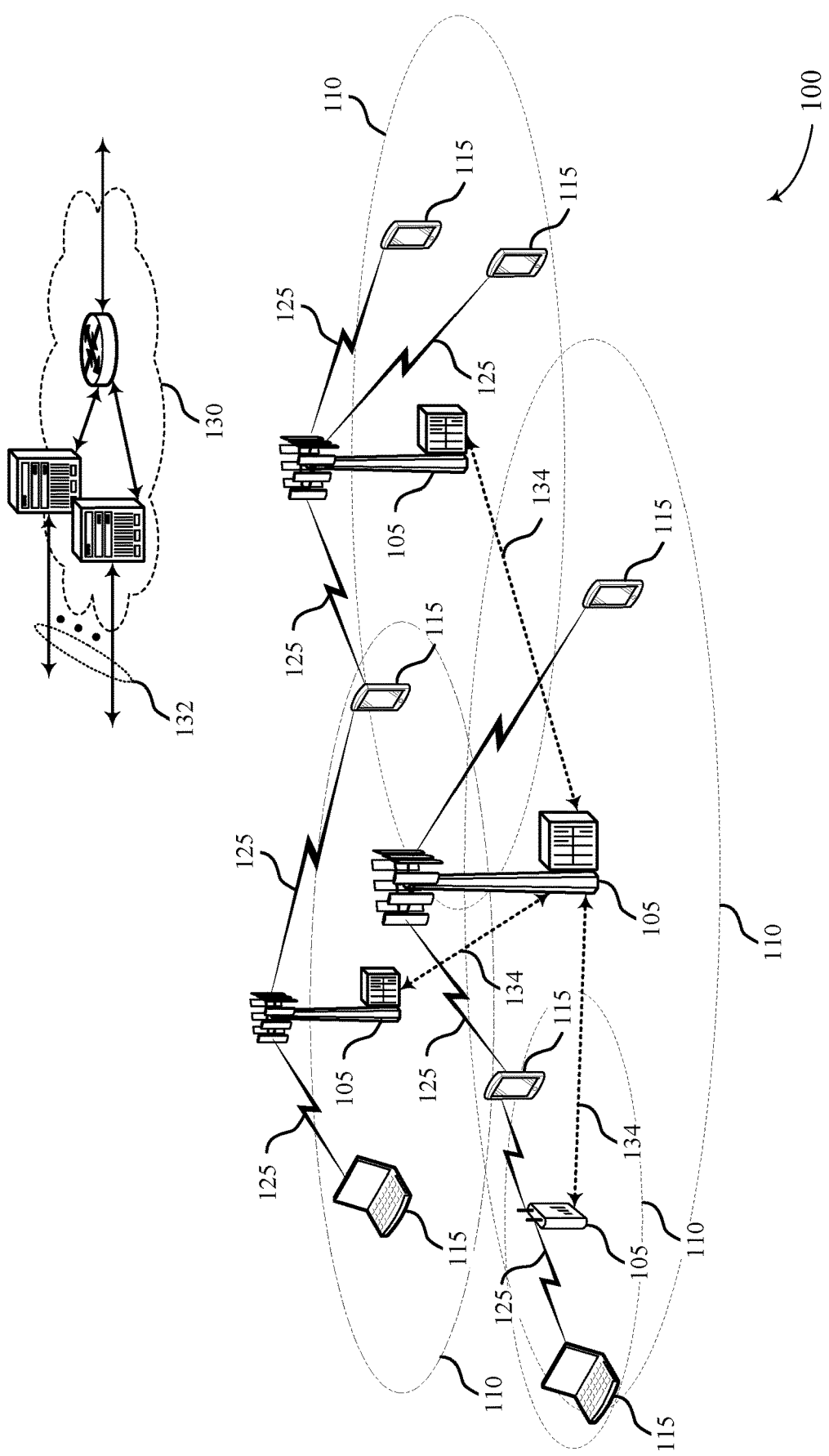
FIG. 1 illustrates an example of a wireless communications system that supports reuse of control channel resource associated with initial access in accordance with aspects of the present disclosure.

A user equipment (UE) may obtain access to a base station by performing an initial access procedure within an initial access bandwidth (e.g., a bandwidth configured for initial access). In some cases, the UE may receive a master information block (MIB) that configures an initial access bandwidth within which the UE may transmit and receive during the initial access procedure. The MIB may configure control resources, such as a control resource set (CORESET) or search spaces, within the initial access bandwidth. Such control resources may include or be referred to as, for example, CORESET #0 and search space #0, which may be unique to the initial access bandwidth. Additionally, the UE may receive a system information block (SIB) (e.g., SIB1) which may also indicate control resources, such as cell-specific control channel search spaces within the initial access bandwidth.

After initial access, communications may continue in a downlink bandwidth part (BWP) configured by the base station. Since the MIB and SIB may have defined control resources for the initial access bandwidth (e.g., CORESET #0 and search space #0), it may be efficient for a UE to monitor for physical downlink control channels (PDCCHs) in the downlink BWP using these defined control resources. As described herein, a UE may attempt to reuse the control resources from the initial access bandwidth if the downlink BWP fully contains (e.g., overlaps in frequency resources and/or time resources and has the same subcarrier spacing) the initial access bandwidth.

In some cases, a UE may verify that the downlink BWP fully contains the initial access bandwidth or may receive an indication from the network explicitly indicating such. For example, the UE may receive dedicated signaling (e.g., via radio resource control (RRC) messaging) that configures a common search space identity (ID) of a cell-specific high-layer PDCCH configuration to some value associated with the downlink BWP fully containing the initial access bandwidth. For instance, the common search space ID may be set to 0 (e.g., which may map to a search space associated with the initial access bandwidth, such as search space #0), which the UE may interpret as an indication that the downlink BWP fully contains the initial access bandwidth. Additionally or alternatively, the UE may receive dedicated RRC signaling that explicitly configures one or more fields of a cell-specific high-layer PDCCH configuration that may be associated with the initial access bandwidth having certain values. Such fields may, for instance, be configured during the initial access procedure. Thus, by configuring these fields via dedicated signaling for the downlink BWP, the UE may determine that the downlink BWP fully contains the initial access bandwidth. Additionally or alternatively, the UE may receive dedicated RRC signaling that explicitly configures one or more search space configurations of a UE-specific high-layer PDCCH configuration to particular search space configuration values. For instance, an ID 0 may be assigned to a search space parameter, which may indicate that the downlink BWP fully contains the initial access bandwidth. In some cases, the network may use a joint configuration utilizing aspect of multiple methods to indicate that the downlink BWP fully contains the initial access bandwidth.

Aspects of the disclosure are initially described in the context of a wireless communications system. An additional wireless communications system and a process flow are then provided to illustrate additional aspects of the disclosure. Aspects of the disclosure are further illustrated by and described with reference to apparatus diagrams, system diagrams, and flowcharts that relate to reuse of control channel resource associated with initial access.

FIG. 1 illustrates an example of a wireless communications system 100 that supports reuse of control channel resource associated with initial access in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., an "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

When first attempting to connect to a base station 105, a UE 115 may monitor a default initial access bandwidth defined by an MIB received from the base station 105. In some cases, the initial access bandwidth may be referred to as an initial downlink BWP, a bandwidth of a first control resource set (CORESET) (e.g., CORESET #0), or a BWP configured by MIB. The UE 115 may receive the MIB via a physical broadcast channel (PBCH) from base station 105. Additionally, the MIB may indicate an SIB1 within the initial access bandwidth, and the SIB1 may provide a cell specific configuration of a control channel common search space (e.g., PDCCH common search space) within the initial access bandwidth for the UE 115 to monitor for control information. The cell specific configuration for a control channel common search space may be referred to as a PDCCH-ConfigCommon message. The PDCCH common search spaces may include control information to schedule the SIB, other system information (OSI), paging information, random access related physical downlink shared channels (PDSCHs), or the like. In some cases, CORESETs and search spaces may be considered control resources.

A BWP may be a bandwidth that the UE 115 can transmit and receive information, where the bandwidth for the BWP may be a subset of a total available bandwidth for communications between the UE 115 and the base station 105. In some examples, a maximum number of four (4) BWPs may be configured for a UE 115, and the UE 115 may monitor a single active BWP at a time. As described herein, during initial access, the UE 115 may monitor a default bandwidth for a MIB, where the default bandwidth may be referred to as the initial access bandwidth. The MIB may be carried by a PBCH, where the PBCH is transmitted together with synchronization signals in a synchronization signal block (SSB) (e.g., a synchronization/PBCH block).

The UE 115 may be considered to be in an initial access before message four (4) of a random access procedure is received (e.g., msg4). The initial access procedure may include acquiring an SSB for time and frequency synchronization, reading the MIB which includes a PDCCH configuration for the SIB1, monitoring the PDCCH indicated by the SIB1, decoding the SIB1 accordingly, decoding OSI, and starting the random access procedure until msg4 is received.

Different search spaces may be configured for different types of control information (e.g., PDCCH scheduling, SIB1, OSI, random access, paging information, etc.). Additionally, common search spaces may be specific to a cell, where multiple UEs 115 may monitor the same common search spaces for control information. The control information may be used for connecting to the cell (e.g., base station 105), scheduling subsequent downlink transmissions, performing random access procedures, reconnecting to a cell, etc.

Cell-specific and UE-specific configuration of PDCCH search spaces may also be provided by the base station 105 to the UE 115 via dedicated signaling, such as by higher layer or RRC signaling after completion of an initial access procedure. In some cases, the cell specific configuration for a control channel search space in the downlink BWP may be different than the cell specific configuration for a common control channel search space provided in the SIB1. However, in other cases, some or all of the search spaces in the initial access bandwidth may occupy the same control, or control channel, resources (e.g., time and frequency resources assigned to PDCCHs) as search spaces in the downlink BWP. In such cases, it may be efficient to reuse control resources, such as CORESETs or search spaces.

Wireless communications system 100 may support efficient techniques for reusing control resources from the initial access bandwidth in the downlink BWP. For example, a UE 115 may perform an initial access procedure within an initial access bandwidth to obtain access to a cell using a first set of control channel resources. After the initial access procedure, the UE 115 may receive a configuration of a downlink BWP for communicating in the cell. The UE 115 may then determine whether the downlink BWP includes the initial access bandwidth. The UE 115 may then monitor for control information within the downlink BWP using a second set of control channel resources that corresponds to the first set of control channel resources.

Figure 2:
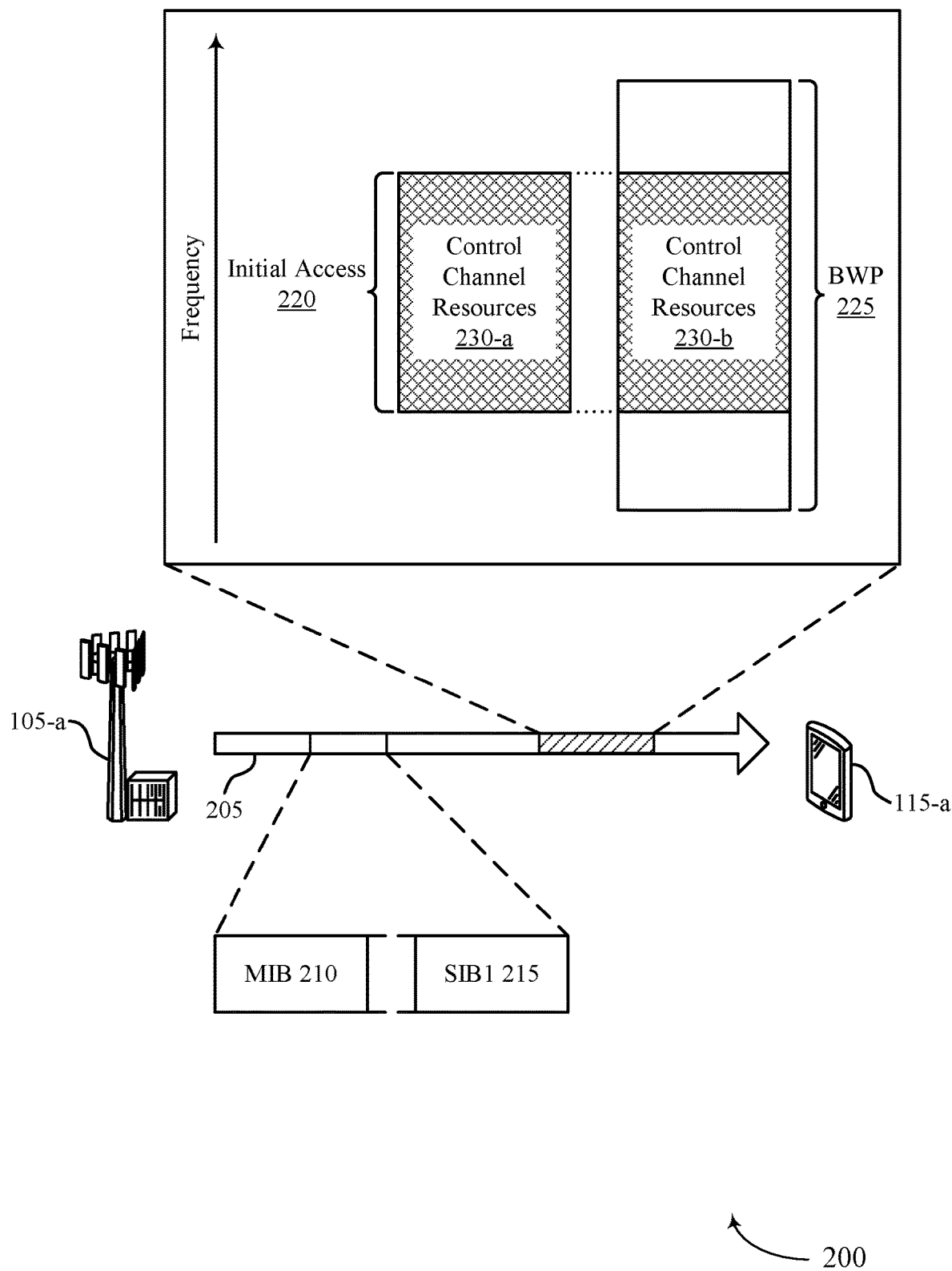
FIG. 2 illustrates an example of a wireless communications system that supports reuse of control channel resource associated with initial access in accordance with aspects of the present disclosure.

FIG. 2 illustrates an example of a wireless communications system 200 that supports reuse of control channel resource associated with initial access in accordance with aspects of the present disclosure. In some examples, wireless communications system 200 may implement aspects of wireless communications system 100. Wireless communications system 200 may support enhanced control information identification through the use of dedicated signaling including information which indicates that control channel resources of an initial access bandwidth are reusable in a downlink BWP. Wireless communications system 200 may further support diminished latency through the reuse of control channel resources associated with an initial access bandwidth, such as CORESETs and search spaces.

Base station 105-a may transmit downlink information to UE 115-a on resources of a carrier 205. When performing an initial access procedure to communicate with base station 105-a, UE 115-a may receive an MIB 210 (e.g., transmitted in a PBCH) that configures a default bandwidth within which UE 115-a may transmit and receive during the initial access procedure. Such a default bandwidth may be referred to as the initial access bandwidth (e.g., initial access bandwidth 220), and may be at least partially defined by a control resource set (CORESET) #0 (i.e., CORESET ID 0). CORESET #0 may specify frequency resources and a time duration associated with one or more search spaces and may be configured, for example, by a pdcch-ConfigSIB1 message. One of the search spaces configured by CORESET #0 may be a search space for SIB1 215 that is mapped to search space ID 0 (i.e., search space #0). In some cases, CORESET #0 and search space #0 may be unique to the initial access bandwidth. Search spaces that may be configured by CORESET #0 or another CORESET within the initial access bandwidth may be intended for PDCCHs scheduling other system information (OSI) or for PDSCHs related to paging or random access. In the case where CORESET #0 specifies resources for multiple search spaces, the search spaces may share the same frequency resources and time duration.

After receiving the MIB 210, UE 115-a may receive SIB1 215. The SIB1 215 may indicate a cell-specific configuration for control channel (e.g., PDCCH) common search spaces within an initial access bandwidth 220. The cell-specific configuration may be referred to as a PDCCH-ConfigCommon message. Additionally or alternatively, UE 115-a may receive a UE-specific configuration, which may be referred to as a PDCCH-Config message. As such, the cell-specific or UE-specific configuration may indicate search spaces within initial access bandwidth 220 for control information monitoring. The initial access bandwidth 220 may accordingly include control channel resources 230-a, which may also be referred to as control resources, and may refer to CORESETs and search spaces (e.g., the CORESET and search spaces defined in MIB 210 and the search spaces defined in SIB1 or other signaling associated with the initial access procedure may be referred to as control channel resources 230).

After the initial access, base station 105-a may transmit dedicated signaling to indicate a downlink BWP 225 and a cell-specific and/or UE-specific configuration of one or more control channel search spaces within downlink BWP 225 transporting control information. The dedicated signaling may be transmitted via RRC signaling or other higher layer signaling. In some cases, the cell specific and/or UE-specific configuration included within the dedicated signaling may indicate control channel resources 230-b within downlink BWP 225, which may be used for receiving control information such as scheduling information for SIB1, OSI, paging information, random access related PDSCHs, or the like. Control channel resources 230-b may share the same frequency resources and time duration as initial access bandwidth 220. An advantage of the control channel resources 230-b sharing frequency resources and time duration with the control channel resources 230-a of the initial access bandwidth 220 is that UE 115-a and base station 105-a may more efficiently use resources by not creating different CORESETs and search spaces with respective BWPs. As such, UE 115-a may not have to determine different control channel resources 230 for different BWPs, thereby improving efficiency and latency associated with identifying control information for communications with base station 105-a. Although the current example describes downlink BWP 225, it is possible that BWP of other link directions (e.g., uplink) may also be used without deviating from the scope of the present disclosure.

In cases where control channel resources 230 (e.g., CORESETs such as CORESET #0 or search spaces) are already defined (e.g., by explicit high layer parameters, such as PDCCH-ConfigCommon, PDCCH-Config, or pdcch-ConfigSIB1; or by a default configuration) in the initial access bandwidth 220, it may be convenient for UE 115-a to monitor for PDCCHs in the downlink BWP using already defined CORESETs and search spaces. For example, UE 115-a may use one or more of the control channel resources 230 defined in the MIB 210 or the SIB1 215 to monitor for PDCCHs. To reuse control channel resources 230-a, UE 115-a may verify or receive an indication from the network that downlink BWP 225 fully contains the initial access bandwidth 220. As used herein, "fully containing" may mean that at least a portion of downlink BWP 225 (e.g., control channel resources 230-b) overlaps in time/frequency resources with all of initial access bandwidth 220 (e.g., including the control channel resources 230-a). In addition, "fully containing" may involve downlink BWP 225 and initial access bandwidth 220 having the same subcarrier spacing (SCS) (e.g., 15 kHz, 60 kHz, 120 kHz). In some cases, control channel resources 230 may include CORSETs and search spaces related to SIB1, OSI, paging and random access (e.g., only the portion of the initial access bandwidth containing such CORSETs and search spaces). In other cases, control channel resources 230 may also include any other CORSETs or search spaces configured in the initial access bandwidth.

In some cases, UE 115-a may reuse control channel resources 230 (e.g., CORESETs or search spaces) of initial access bandwidth 220 after verifying that the downlink BWP 225 fully contains the initial access bandwidth 220 (e.g., by comparing the frequency resources and time duration of downlink BWP 225 to the initial access bandwidth 220). In other cases, reuse of control channel resources 230 may be explicitly enabled by the network (e.g., by an indication from base station 105-a). An advantage of explicit enablement by the network is that it may minimize the UE-side computation required to verify that downlink BWP 225 fully contains the initial access bandwidth 220. Explicit enablement by the network may include indicating to UE 115-a that the downlink BWP 225 contains initial access bandwidth 220. In some cases, the network (e.g., base station 105-a) and UE 115-a may assume that CORESET #0 and search space #0 are unique to the initial access bandwidth 220, and the network may explicitly enable UE 115-a based on this assumption. For instance, base station 105-a may provide (e.g., via the dedicated RRC signaling) UE 115-a with an indication, such as a UE-specific or cell-specific PDCCH configuration related to CORESET #0 or search space #0 that implies to UE 115-a that the downlink BWP 225 contains initial access bandwidth 220. Once UE 115-a receives the indication, UE 115-a may be aware it is to reuse the control channel resources 230 of initial access bandwidth 220.

In one example, the dedicated RRC signaling in the downlink BWP 225 may indicate that the downlink BWP 225 fully contains the initial access bandwidth 220 by configuring a common search space ID of a cell-specific high-layer PDCCH configuration (e.g., PDCCH-Config-Common). For instance, PDCCH-ConfigCommon may contain the IDs and configuration parameters for up to four common search spaces associated with SIB1, OSI, paging, and random access. One or more of these common search spaces may have their ID set to 0, which may indicate to UE 115-a that the downlink BWP 225 contains initial access bandwidth 220. After receiving the indication that one or more of the common search spaces have their ID set to 0, UE 115-a may identify the frequency and time domain information of the control channel resources 230 to be reused. In some cases, such information may be acquired from a MIB 210 (e.g., derived from the MIB 210 used for initial access or a subsequent MIB 210). Additionally or alternatively, such information may be acquired from a cell-specific PDCCH configuration, such as PDCCH-ConfigCommon, and/or a UE-specific PDCCH configuration, such as PDCCH-Config, received (e.g., by a SIB1 215 or otherwise) in the initial access bandwidth.

In another example, the dedicated RRC signaling in the downlink BWP 225 may indicate that the downlink BWP 225 fully contains the initial access bandwidth 220 by explicitly configuring a number of bits of one or more fields of a cell-specific high-layer PDCCH configuration (e.g., PDCCH-ConfigCommon) that are associated with the initial access bandwidth. For example, the dedicated RRC signaling may configure a number of bits (e.g., 4 bits) of fields associated with search space #0 (e.g., searchSpaceZero) and/or the fields associated with CORESET #0 (e.g., controlResourceSetZero). The fields configured in the cell-specific high-layer PDCCH configuration may be consistent with those configured by the MIB 210 associated with the initial access bandwidth 220. In cases where the fields are unique to initial access bandwidth 220, the fields may be set to arbitrary values (e.g., the fields being set to any value indicate to UE 115-a that the downlink BWP 225 contains the initial access bandwidth 220).

Alternatively, in the same or other cases, the fields may be set to specific values which indicate to UE 115-a that the downlink BWP 225 contains the initial access bandwidth 220. After receiving the field values, UE 115-a may identify the frequency and time domain information of control channel resources 230 to be reused. In some cases, such information may be determined from the MIB 210. In other cases, such information may be obtained from a cell-specific PDCCH configuration, such as PDCCH-ConfigCommon, and/or a UE-specific PDCCH configuration, such as PDCCH-Config, received (e.g., by SIB1 215 or otherwise) in the initial access bandwidth. In cases where fields associated with search space #0 and/or CORESET #0 are configured by the dedicated RRC signaling, UE 115-a may choose to determine the remaining resources not explicitly indicated by the field(s). For example, if the dedicated RRC signaling indicates searchSpaceZero, UE 115-a may assume that search space #0 is to be reused and obtain frequency and timing information related to other CORESETs and/or other search spaces. In another example, if the dedicated RRC signaling indicates controlResourceSetZero, UE 115-a may assume that CORSET #0 is to be reused and may read the frequency and timing information related to CORSETs and/or search spaces not covered by CORSET #0.

In another example, the dedicated RRC signaling in the downlink BWP 225 may indicate that the downlink BWP 225 fully contains the initial access bandwidth 220 by explicitly configuring one or more parameters of a UE-specific high-layer PDCCH configuration (e.g., PDCCH-Config). For example, a search space configuration (e.g., searchSpace) may be configured with search space ID 0, which may represent search space #0. In some cases, a CORESETID field in the search space configuration may be set to 0, which may represent CORESET #0. In addition, other parameters of the search space configuration (e.g., periodicity, slot offset, start symbol of the search space occasions, monitored aggregation levels, number of PDCCH candidates for each monitored aggregation level, etc.) may optionally be configured. If such parameters are not configured, UE 115-*a* may obtain this information from the MIB 210 or a cell-specific high-layer PDCCH configuration (e.g., PDCCH-ConfigCommon).

After receiving the configuration values, UE 115-*a* may identify the frequency and time domain information of control channel resources 230 to be reused. In some cases, such information may be found from the MIB 210. In other cases, such information may be found from a cell-specific PDCCH configuration, such as PDCCH-ConfigCommon, and/or a UE-specific PDCCH configuration, such as PDCCH-Config, received (e.g., by SIB1 215 or otherwise) in the initial access bandwidth. In cases where the search space configuration is configured with search space ID 0 and/or a CORSET ID value of 0, UE 115-*a* may choose to determine the remaining control channel resources 230. For example, if the dedicated RRC signaling indicates that a search space configuration is configured with search space ID 0, then UE 115-*a* may assume that search space #0 is to be reused and only identify frequency and timing information related to CORESETs and/or other search spaces. In another example, if the dedicated RRC signaling indicates a CORESET ID value of 0, then UE 115-*a* may assume that CORSET #0 is to be reused and acquire frequency and timing information related to other CORSETs and/or search spaces not covered by CORSET #0.

In some cases, two or more of the above examples may be used in conjunction for indicating that the downlink BWP 225 fully contains the initial access bandwidth 220. Likewise, and as described herein, remaining frequency and time-domain information related to the reuse of a control channel resources 230 in the initial access bandwidth 220 by downlink BWP 225 may be derived from a MIB 210, a cell-specific PDCCH configuration, a UE-specific PDCCH configuration, or a combination thereof.

Figure 3:
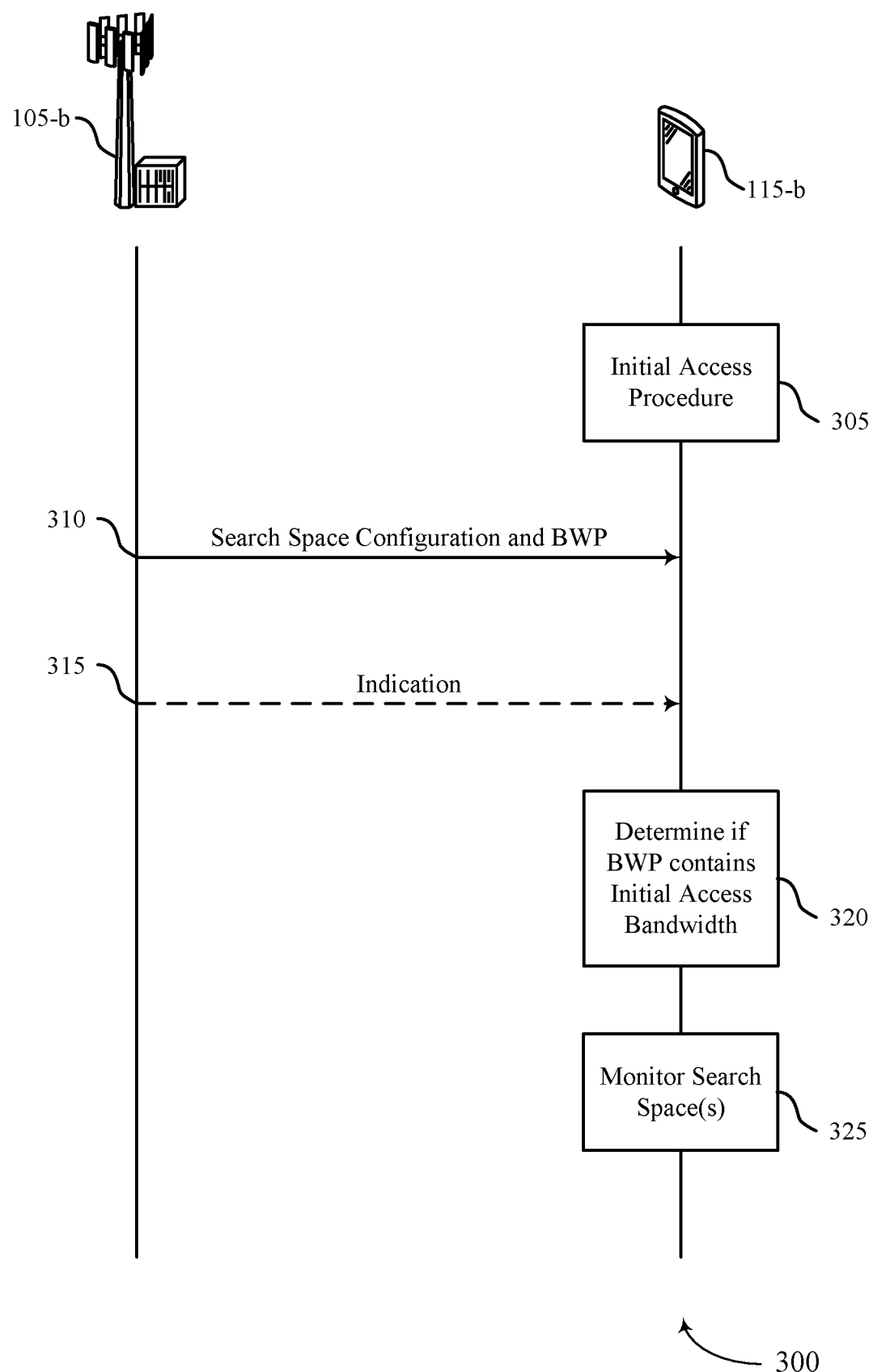
FIG. 3 illustrates an example of a process flow that supports reuse of control channel resource associated with initial access in accordance with aspects of the present disclosure.

FIG. 3 illustrates an example of a process flow 300 that supports reuse of control channel resource associated with initial access in accordance with aspects of the present disclosure. In some examples, process flow 300 may implement aspects of wireless communications system 100 and/or 200. Process flow 300 may include a base station 105-*b* and a UE 115-*b*, which may be examples of corresponding base stations 105 and UEs 115, respectively, as described herein with references to FIGS. 1 and 2.

In the following description of the process flow 300, the operations between UE 115-*b* and base station 105-*b* may be performed in different orders or at different times. Some operations may also be left out of the process flow 300, or other operations may be added to the process flow 300. It is to be understood that while UE 115-*b* and base station 105-*b* are shown performing a number of the operations of process flow 300, any wireless device may perform the operations shown.

At 305, UE 115-*b* may perform an initial access procedure with an initial access bandwidth to obtain access to a cell. Performing the initial access procedure may include using an initial access bandwidth containing one or more control resources, which may also be referred to as control channel resources. The one or more control resources may include CORESETs (e.g., CORESET #0), common search spaces, or UE-specific search spaces and may span over resources in the time and frequency domains. The control resources may be indicated by a MIB, SIB1, or other types of signaling.

At 310, base station 105-*b* may transmit a configuration of a downlink BWP for communicating with a cell. At 315, base station 105-*b* may transmit an indication that the downlink bandwidth part fully contains the initial access bandwidth. The indication may include dedicated RRC signaling that configures a control channel ID (e.g., common search space ID) of a cell-specific high-layer PDCCH configuration to a certain value. Such a value may be associated with a control channel search space of the initial access bandwidth (e.g., search space #0). Additionally or alternatively, the indication may include dedicated RRC signaling that explicitly configures one or more fields of a cell-specific high-layer PDCCH configuration that are associated with the initial access bandwidth with arbitrary or specific values. Such fields may include a search space field (e.g., searchSpaceZero) or a control resource set field (e.g., controlResourceSetZero).

Additionally or alternatively, the indication may include dedicated RRC signaling that explicitly configures one or more search space configurations of a UE-specific high-layer PDCCH configuration to particular configuration values. Such search space configurations may include values related to a control channel search space (e.g., searchSpace) and/or a control resource set (e.g., CORESET ID). The indication may further include a set of parameters, including a search space periodicity, a slot offset, a starting symbol period (e.g., in accordance with a bitmap) of a control channel search space, an aggregation level, or a combination thereof.

At 320, UE 115-*b* may determine that the downlink BWP fully contains the initial access bandwidth. For example, UE 115-*b* may explicitly compare frequency-domain resources and time-domain durations of the initial access bandwidth with those of the downlink BWP. Alternatively, UE 115-*b* may use the indication transmitted at 315. At 325, UE 115-*b* may monitor for control information within the downlink BWP. In such cases, UE 115-*b* may monitor control channel resources within the downlink BWP that correspond to the control channel resources within the initial access bandwidth. In some examples, the monitoring may be based on a determination that the downlink bandwidth part contains the initial access bandwidth, for example, through the indication received at 315. That is, a determination that the initial access bandwidth is contained in the downlink BWP may trigger UE 115-*b* to monitor corresponding control resources.

Figure 4:
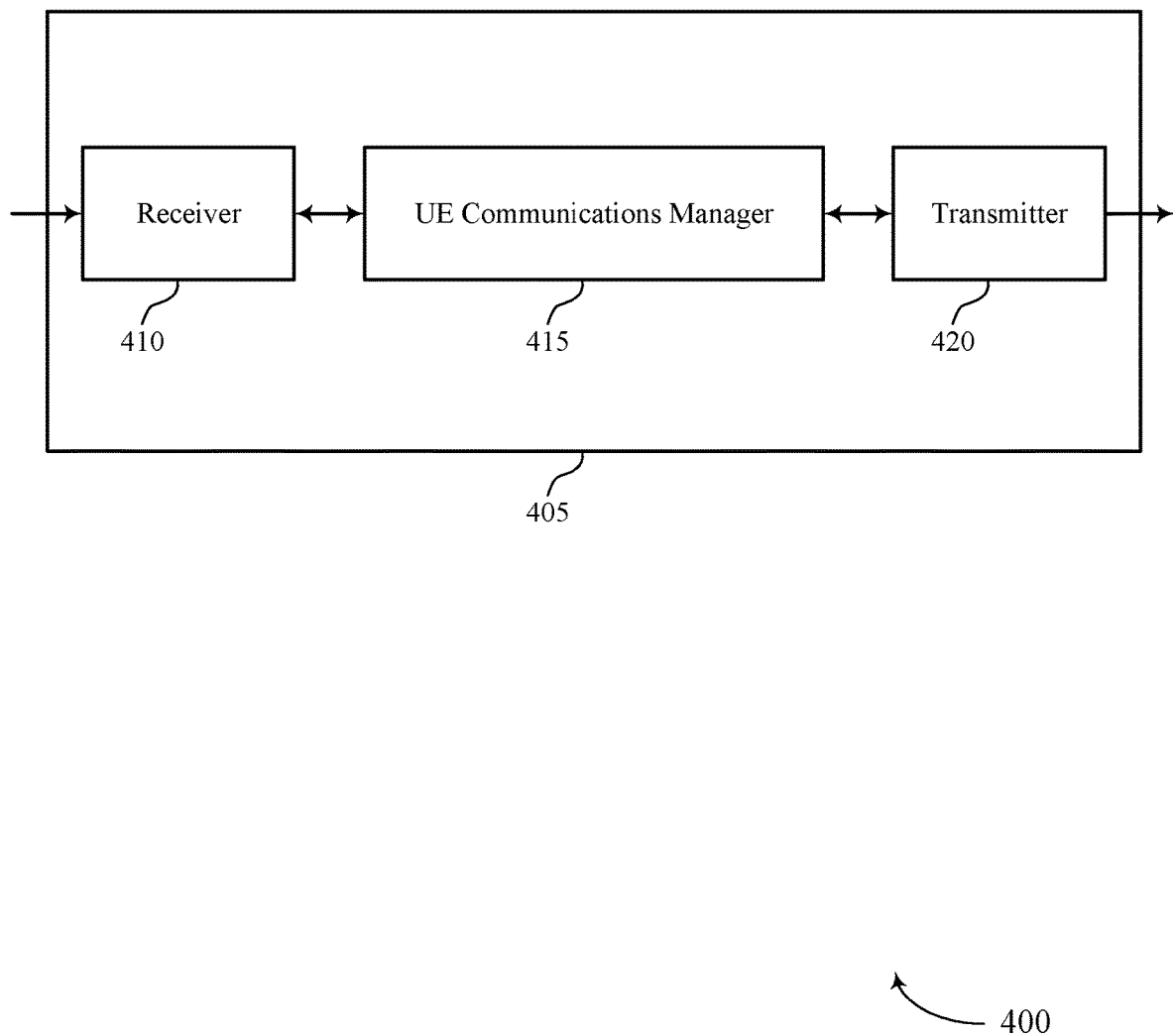
FIGS. 4 and 5 show block diagrams of devices that support reuse of control channel resource associated with initial access in accordance with aspects of the present disclosure.

FIG. 4 shows a block diagram 400 of a device 405 that supports reuse of control channel resource associated with initial access in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to reuse of control channel resource associated with initial access, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may perform an initial access procedure within an initial access bandwidth to obtain access to a cell, where the initial access bandwidth may include first control channel resources. In some cases, UE communications manager 415 may receive, after the initial access procedure, a configuration of a downlink BWP for communicating with the cell and determine whether the downlink BWP includes the initial access bandwidth. In some examples, UE communications manager 415 may monitor for control information within the downlink BWP using second control channel resources that correspond to the first control channel resources, where the monitoring is based on a determination that the downlink BWP contains the initial access bandwidth. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the UE communications manager 415 may be implemented as an integrated circuit or chipset for a mobile device modem, and the receiver 410 and transmitter 420 may be implemented as analog components (e.g., amplifiers, filters, antennas, etc.) and optionally with digital circuits (e.g., frontend filters, equalizers, etc.) coupled with the mobile device modem to enable wireless transmission and reception.

The UE communications manager 415 as described herein may be implemented to realize one or more potential advantages. Various implementations may enable a UE and a network to reuse control channel resources from an initial access bandwidth in a downlink BWP. At least one implementation may enable the UE communications manager 415 to effectively monitor for physical channels (such as PDCCHs) in a downlink BWP using a defined set of control resources.

Based on implementing the control channel reuse techniques as described herein, one or more processors of the device 405 (e.g., processor(s) controlling or incorporated with one or more of receiver 410, UE communications manager 415, and transmitter 420) may reduce an amount of time to identify resources for communication between devices in the network. In addition, the various techniques described herein may reduce the amount of computational processing (e.g., processing channel information in various BWPs) performed by the UE, which may save power and enhance user experience.

Figure 5:
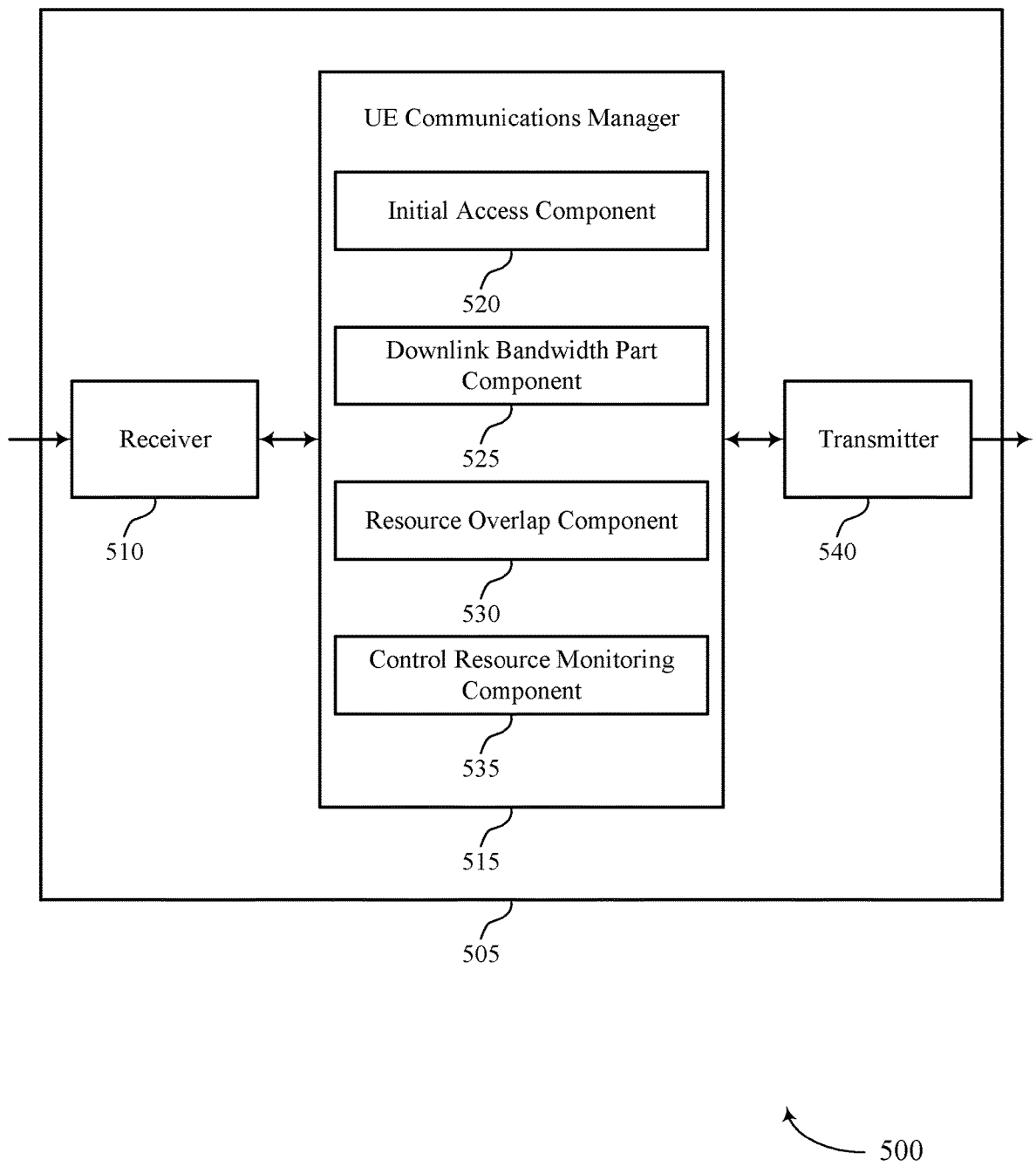

FIG. 5 shows a block diagram 500 of a device 505 that supports reuse of control channel resource associated with initial access in accordance with aspects of the present disclosure. The device 505 may be an example of aspects of a device 405, or a UE 115 as described herein. The device 505 may include a receiver 510, a UE communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to reuse of control channel resource associated with initial access, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include an initial access component 520, a downlink bandwidth part component 525, a resource overlap component 530, and a control resource monitoring component 535. The UE communications manager 515 may be an example of aspects of the UE communications manager 710 described herein.

The initial access component 520 may perform an initial access procedure within an initial access bandwidth to obtain access to a cell, the initial access bandwidth including first control channel resources. The downlink bandwidth part component 525 may receive, after the initial access procedure, a configuration of a downlink BWP for communicating with the cell. The resource overlap component 530 may determine whether the downlink BWP includes the initial access bandwidth.

The control resource monitoring component 535 may monitor for control information within the downlink BWP using second control channel resources that correspond to the first control channel resources, where the monitoring is based on a determination that the downlink BWP contains the initial access bandwidth.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
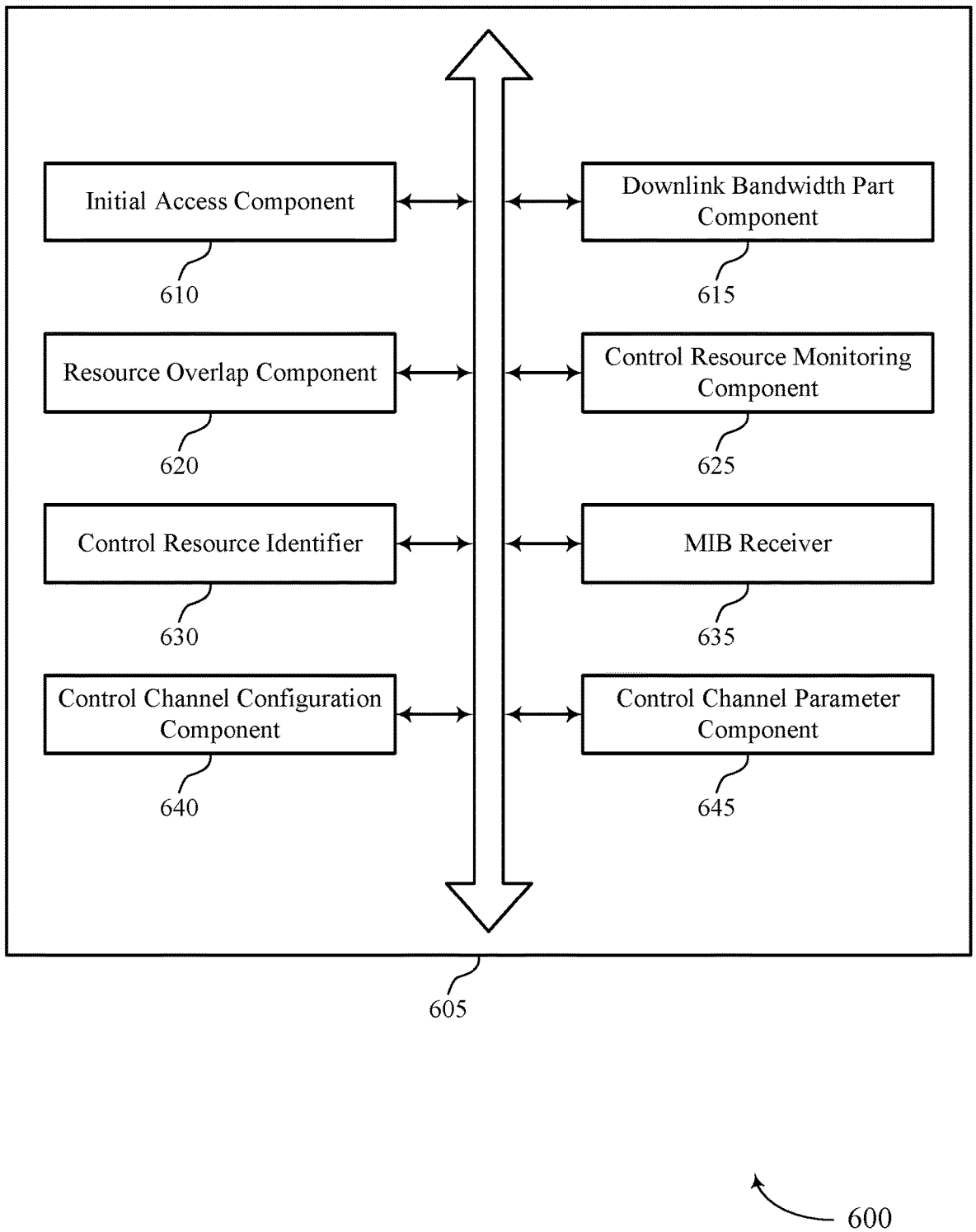
FIG. 6 shows a block diagram of a user equipment (UE) communications manager that supports reuse of control channel resource associated with initial access in accordance with aspects of the present disclosure.

FIG. 6 shows a block diagram 600 of a UE communications manager 605 that supports reuse of control channel resource associated with initial access in accordance with aspects of the present disclosure. The UE communications manager 605 may be an example of aspects of a UE communications manager 415, a UE communications manager 515, or a UE communications manager 710 described herein. The UE communications manager 605 may include an initial access component 610, a downlink bandwidth part component 615, a resource overlap component 620, a control resource monitoring component 625, a control resource identifier 630, a MIB receiver 635, a control channel configuration component 640, and a control channel parameter component 645. Each of these modules may communicate, directly or indirectly, with one another (e.g., via one or more buses).

The initial access component 610 may perform an initial access procedure within an initial access bandwidth to obtain access to a cell, the initial access bandwidth including first control channel resources. The downlink bandwidth part component 615 may receive, after the initial access procedure, a configuration of a downlink BWP for communicating with the cell. In some cases, the initial access bandwidth and the downlink BWP have a same subcarrier spacing.

The resource overlap component 620 may determine whether the downlink BWP includes the initial access bandwidth. In some examples, the resource overlap component 620 may receive an indication that the downlink BWP includes the initial access bandwidth, the indication including a control channel configuration for the second control channel resources that is associated with the first control channel resources. In some examples, the resource overlap component 620 may receive the control channel configuration via radio resource control signaling.

The control resource monitoring component 625 may monitor for control information within the downlink BWP using second control channel resources that correspond to the first control channel resources, where the monitoring is based on a determination that the downlink BWP contains the initial access bandwidth. In some cases, the second control channel resources include one or more control resource sets, one or more control channel search spaces, or a combination thereof. In some cases, at least one of the one or more control resource sets or at least one of the one or more control channel search spaces are used to convey a system information block, other system information, page information, random access information, or a combination thereof.

The control resource identifier 630 may identify, within the control channel configuration, at least one common search space identity that indicates one or more control channel search spaces of the second control channel resources are associated with a control channel search space of the first control channel resources. In some examples, the control resource identifier 630 may identify, within the control channel configuration, a search space field, or a control resource set field, or a combination thereof, that indicates a control channel search space and a control resource set of the second control channel resources are associated with a control channel search space or a control resource set of the first control channel resources. In some examples, the control resource identifier 630 may identify, within the control channel configuration, a search space configuration that indicates a control channel search space, or a control resource set, or both, of the second control channel resources is associated with the first control channel resources.

In some examples, the control resource identifier 630 may identify, within the control channel configuration, a common search space identity, a search space field, a control resource set field, a search space configuration, or a combination thereof, that indicates the second control channel resources are associated with the first control channel resources. In some cases, the control channel configuration includes a cell-specific control channel configuration for the second control channel resources. In some cases, the at least one common search space identity corresponds to a common control channel search space that is used to convey a system information block, other system information, page information, random access information, or any combination thereof. In some cases, the control channel configuration includes a UE-specific control channel configuration for the second control channel resources.

The MIB receiver 635 may receive a master information block. In some examples, the MIB receiver 635 may determine time domain and frequency domain information of the second control channel resources based on the received master information block. In some examples, the MIB receiver 635 may determine time domain and frequency domain information of the second control channel resources based on the master information block, where the search space field or the control resource set field include information that is consistent with information configured by the master information block. In some examples, the MIB receiver 635 may determine time domain and frequency domain information of the second control channel resources, or a set of parameters of the second control channel resources, or a combination thereof, based on the received master information block.

The control channel configuration component 640 may receive, within the initial access bandwidth, a cell-specific control channel configuration and a UE-specific control channel configuration. In some examples, the control channel configuration component 640 may determine time domain and frequency domain information of the second control channel resources based on the cell-specific control channel configuration or the UE-specific control channel configuration, or both. In some examples, the control channel configuration component 640 may determine time domain and frequency domain information of the second control channel resources, or a set of parameters of the second control channel resources, or a combination thereof, based on the cell-specific control channel configuration or the UE-specific control channel configuration, or both.

The control channel parameter component 645 may identify a set of parameters for the second control channel resources using the search space configuration, where the set of parameters includes a search space periodicity, a slot offset, a starting symbol bitmap of a control channel search space, an aggregation level, or any combination thereof.

Figure 7:
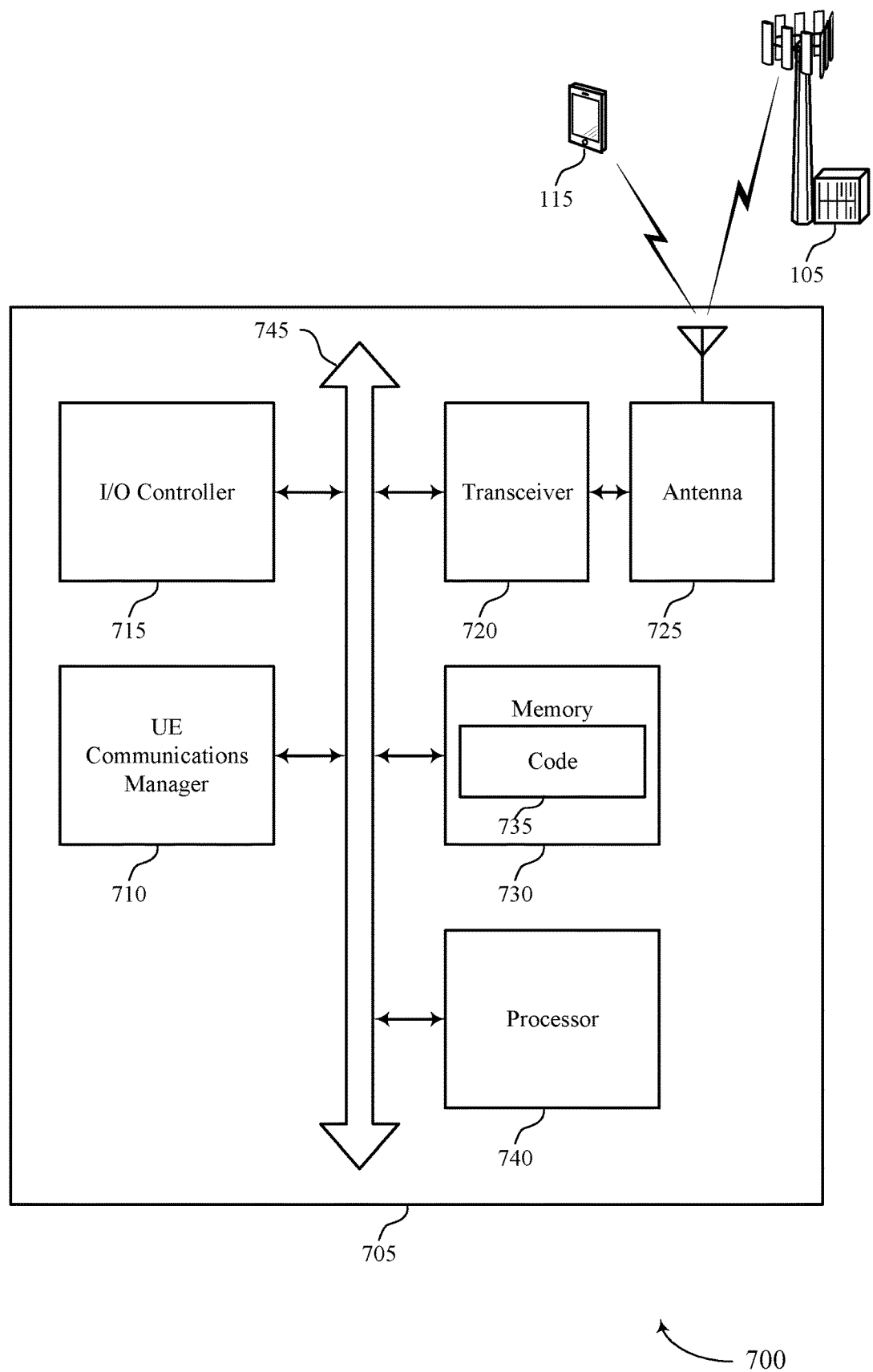
FIG. 7 shows a diagram of a system including a device that supports reuse of control channel resource associated with initial access in accordance with aspects of the present disclosure.

FIG. 7 shows a diagram of a system 700 including a device 705 that supports reuse of control channel resource associated with initial access in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may perform an initial access procedure within an initial access bandwidth to obtain access to a cell, the initial access bandwidth including first control channel resources, receive, after the initial access procedure, a configuration of a downlink BWP for communicating with the cell, determine whether the downlink BWP includes the initial access bandwidth, and monitor for control information within the downlink BWP using second control channel resources that correspond to the first control channel resources, where the monitoring is based on a determination that the downlink BWP contains the initial access bandwidth.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases, the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting reuse of control channel resource associated with initial access).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
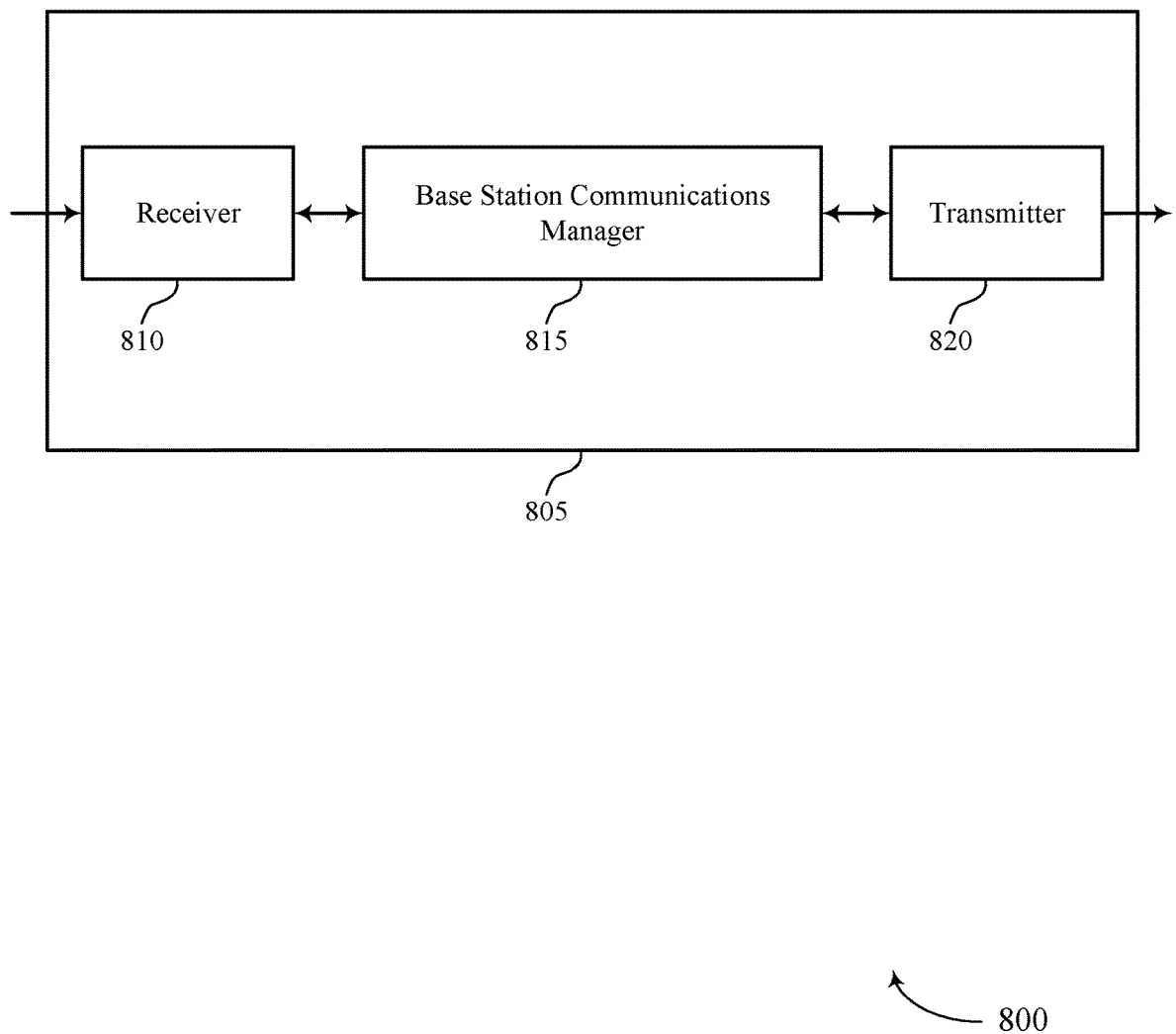
FIGS. 8 and 9 show block diagrams of devices that support reuse of control channel resource associated with initial access in accordance with aspects of the present disclosure.

FIG. 8 shows a block diagram 800 of a device 805 that supports reuse of control channel resource associated with initial access in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to reuse of control channel resource associated with initial access, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may perform an initial access procedure within an initial access bandwidth to provide a UE 115 access to a cell of the base station, where the initial access bandwidth may include first control channel resources. In some cases, the base station communications manager 815 may transmit, after the initial access procedure, a configuration of a downlink BWP for communicating with the UE 115 and transmit an indication that the downlink BWP includes the initial access bandwidth. In some examples, the base station communications manager 815 may transmit control information within the downlink BWP using second control channel resources that correspond to the first control channel resources, where the transmitting is based on the downlink BWP including the initial access bandwidth. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
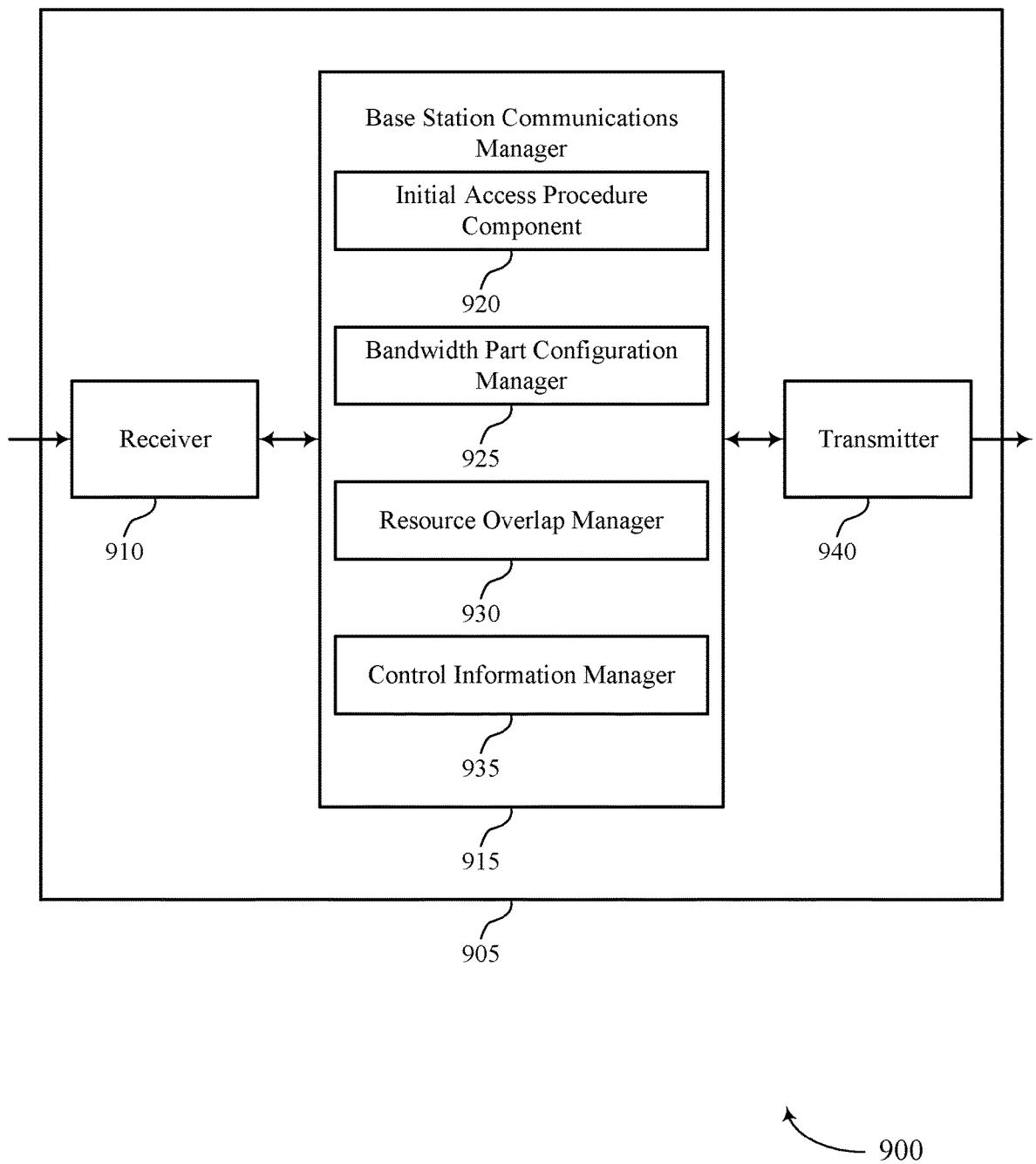

FIG. 9 shows a block diagram 900 of a device 905 that supports reuse of control channel resource associated with initial access in accordance with aspects of the present disclosure. The device 905 may be an example of aspects of a device 805, or a base station 105 as described herein. The device 905 may include a receiver 910, a base station communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to reuse of control channel resource associated with initial access, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include an initial access procedure component 920, a bandwidth part configuration manager 925, a resource overlap manager 930, and a control information manager 935. The base station communications manager 915 may be an example of aspects of the base station communications manager 1110 described herein.

The initial access procedure component 920 may perform an initial access procedure within an initial access bandwidth to provide a UE 115 access to a cell of the base station, the initial access bandwidth including first control channel resources. The bandwidth part configuration manager 925 may transmit, after the initial access procedure, a configuration of a downlink BWP for communicating with the UE 115.

The resource overlap manager 930 may transmit an indication that the downlink BWP includes the initial access bandwidth. The control information manager 935 may transmit control information within the downlink BWP using second control channel resources that correspond to the first control channel resources, where the transmitting is based on the downlink BWP including the initial access bandwidth.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
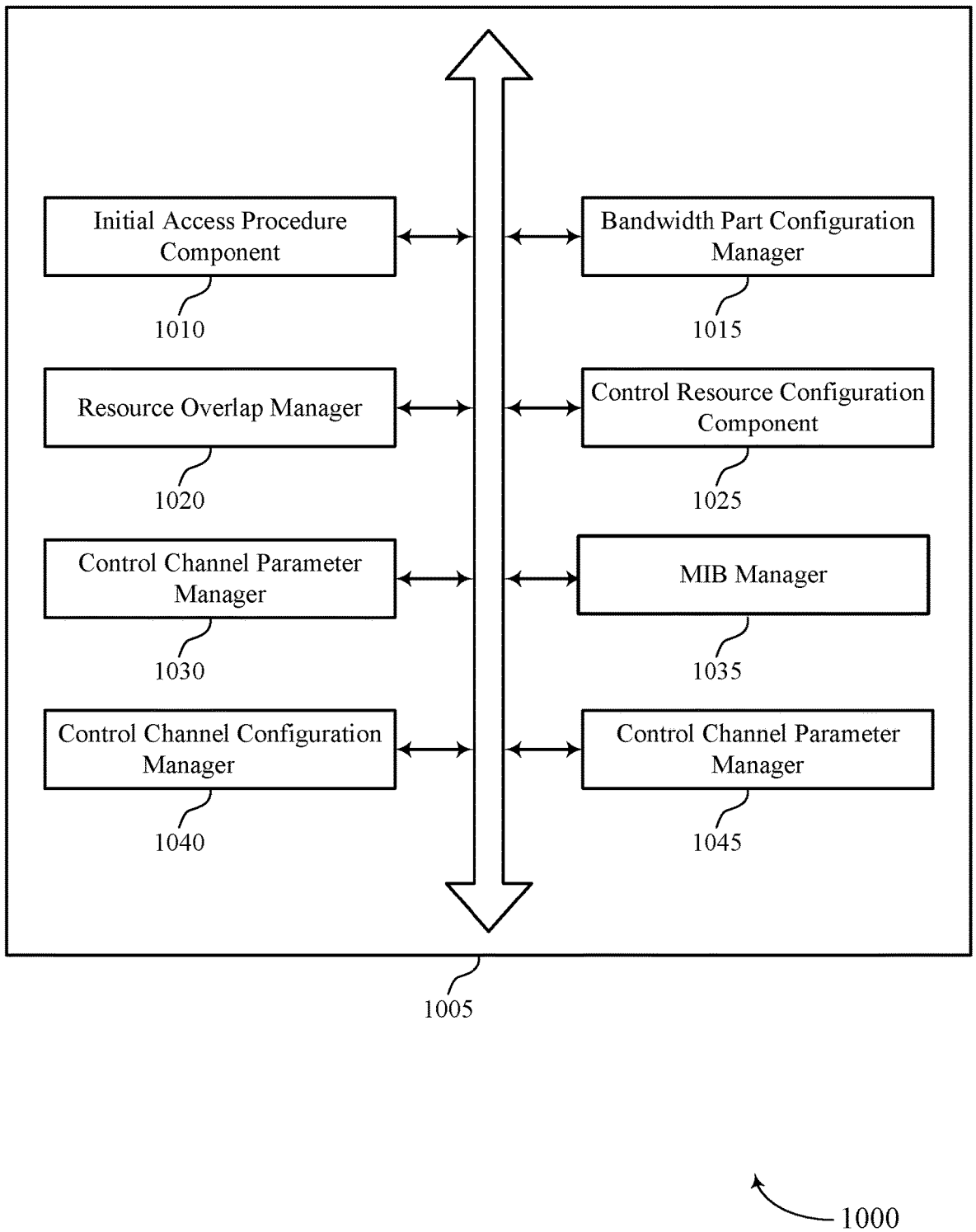
FIG. 10 shows a block diagram of a base station communications manager that supports reuse of control channel resource associated with initial access in accordance with aspects of the present disclosure.

FIG. 10 shows a block diagram 1000 of a base station communications manager 1005 that supports reuse of control channel resource associated with initial access in accordance with aspects of the present disclosure. The base station communications manager 1005 may be an example of aspects of a base station communications manager 815, a base station communications manager 915, or a base station communications manager 1110 described herein. The base station communications manager 1005 may include an initial access procedure component 1010, a bandwidth part configuration manager 1015, a resource overlap manager 1020, a control information manager 1025, a control resource configuration component 1030, an MIB manager 1035, a control channel configuration manager 1040, and a control channel parameter manager 1045. Each of these modules may communicate, directly or indirectly, with one another (e.g., via one or more buses).

The initial access procedure component 1010 may perform an initial access procedure within an initial access bandwidth to provide a UE 115 access to a cell of the base station, the initial access bandwidth including first control channel resources. The bandwidth part configuration manager 1015 may transmit, after the initial access procedure, a configuration of a downlink BWP for communicating with the UE 115. In some cases, the initial access bandwidth and the downlink BWP have a same subcarrier spacing.

The resource overlap manager 1020 may transmit an indication that the downlink BWP includes the initial access bandwidth. In some examples, the resource overlap manager 1020 may transmit the control channel configuration via radio resource control signaling. In some cases, the indication that the downlink BWP includes the initial access bandwidth includes a control channel configuration for the second control channel resources that is associated with the first control channel resources.

The control information manager 1025 may transmit control information within the downlink BWP using second control channel resources that correspond to the first control channel resources, where the transmitting is based on the downlink BWP including the initial access bandwidth. In some cases, the second control channel resources include one or more control resource sets, one or more control channel search spaces, or a combination thereof. In some cases, at least one of the one or more control resource sets or at least one of the one or more control channel search spaces are used to convey a system information block, other system information, page information, random access information, or a combination thereof.

The control resource configuration component 1030 may configure, within the control channel configuration, at least one common search space identity that indicates one or more control channel search spaces of the second control channel resources are associated with a control channel search space of the first control channel resources. In some examples, the control resource configuration component 1030 may configure, within the control channel configuration, a search space field, or a control resource set field, or a combination thereof, that indicates a control channel search space and a control resource set of the second control channel resources are associated with a control channel search space or a control resource set of the first control channel resources. In some examples, the control resource configuration component 1030 may configure, within the control channel configuration, a search space configuration that indicates a control channel search space, or a control resource set, or both, of the second control channel resources is associated with the first control channel resources.

In some examples, the control resource configuration component 1030 may configure, within the control channel configuration, a common search space identity, a search space field, a control resource set field, a search space configuration, or a combination thereof, that indicates the second control channel resources are associated with the first control channel resources. In some cases, the control channel configuration includes a cell-specific control channel configuration for the second control channel resources. In some cases, the at least one common search space identity corresponds to a common search space that is used to convey a system information block, other system information, page information, random access information, or any combination thereof. In some cases, the control channel configuration includes a UE-specific control channel configuration for the second control channel resources.

The MIB manager 1035 may transmit a master information block that indicates time domain and frequency domain information of the second control channel resources. In some examples, the MIB manager 1035 may transmit a master information block that indicates time domain and frequency domain information of the second control channel resources, where the search space field or the control resource set field include information that is consistent with information configured by the master information block. In some examples, the MIB manager 1035 may transmit a master information block that indicates time domain and frequency domain information of the second control channel resources, or a set of parameters of the second control channel resources, or a combination thereof.

The control channel configuration manager 1040 may transmit, within the initial access bandwidth, a cell-specific control channel configuration and a UE-specific control channel configuration, where the cell-specific control channel configuration or the UE-specific control channel configuration, or both, indicate time domain and frequency domain information of the second control channel resources. In some examples, the control channel configuration manager 1040 may transmit, within the initial access bandwidth, a cell-specific control channel configuration and a UE-specific control channel configuration, where the cell-specific control channel configuration or the UE-specific control channel configuration, or both, indicate time domain and frequency domain information of the second control channel resources, or a set of parameters of the second control channel resources, or a combination thereof.

The control channel parameter manager 1045 may configure, within the search space configuration, a set of parameters for the second control channel resources, where the set of parameters includes a search space periodicity, a slot offset, a starting symbol period (e.g., a bitmap) of a control channel search space, an aggregation level, or any combination thereof.

Figure 11:
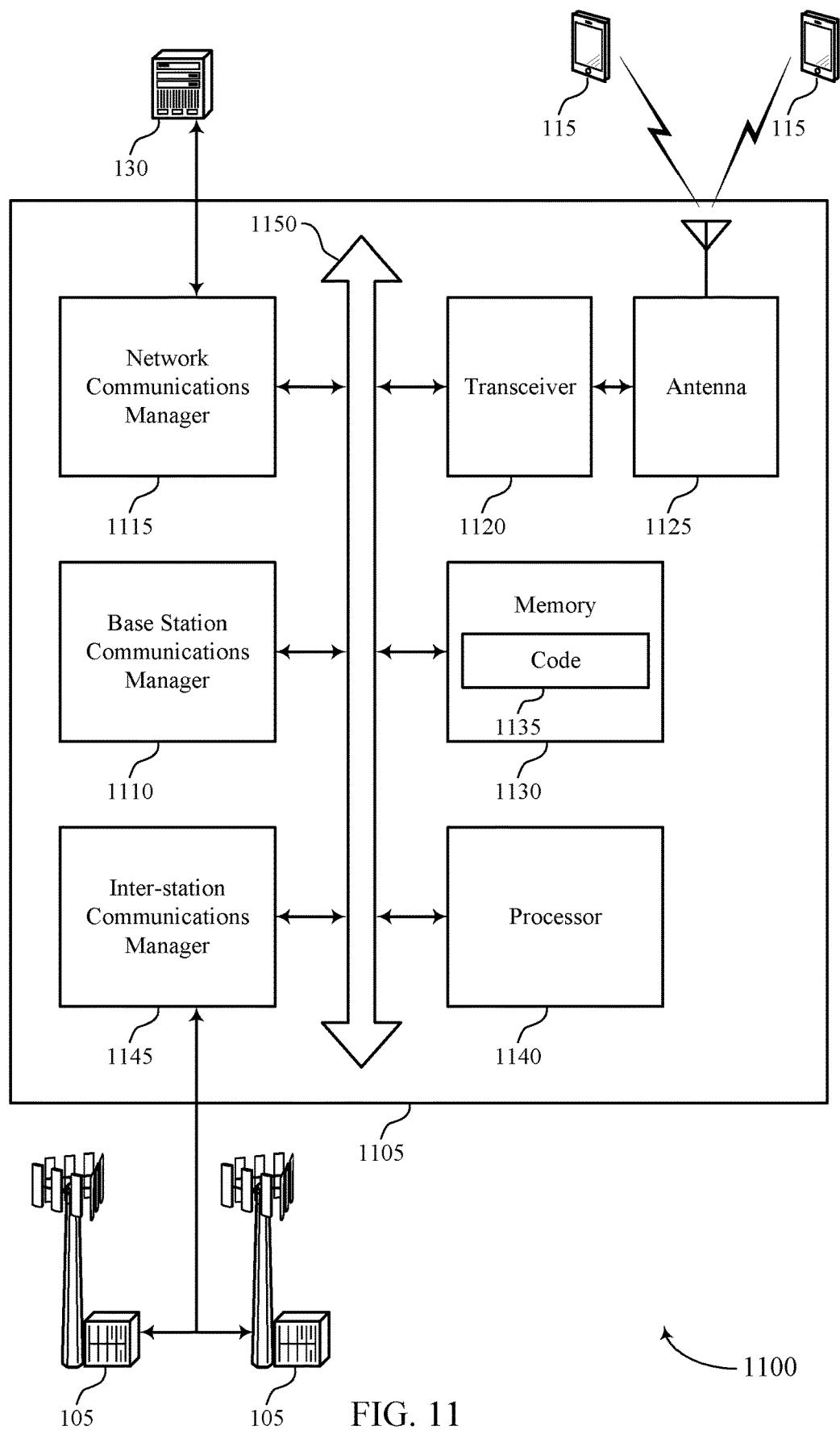
FIG. 11 shows a diagram of a system including a device that supports reuse of control channel resource associated with initial access in accordance with aspects of the present disclosure.

FIG. 11 shows a diagram of a system 1100 including a device 1105 that supports reuse of control channel resource associated with initial access in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may perform an initial access procedure within an initial access bandwidth to provide a UE 115 access to a cell of the base station, the initial access bandwidth including first control channel resources, transmit, after the initial access procedure, a configuration of a downlink BWP for communicating with the UE 115, transmit an indication that the downlink BWP includes the initial access bandwidth, and transmit control information within the downlink BWP using second control channel resources that correspond to the first control channel resources, where the transmitting is based on the downlink BWP including the initial access bandwidth.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting reuse of control channel resource associated with initial access).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
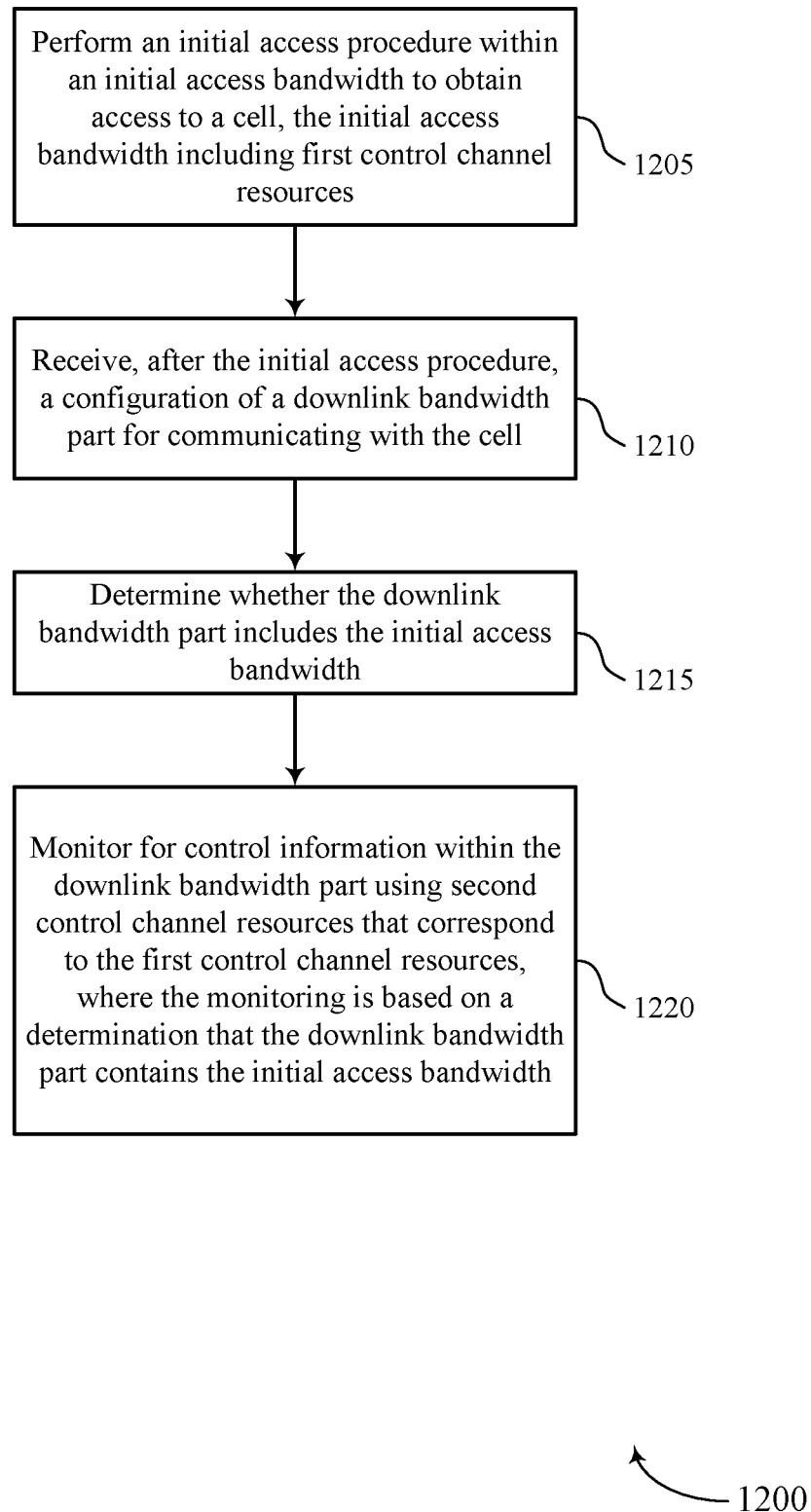
FIGS. 12 through 16 show flowcharts illustrating methods that support reuse of control channel resource associated with initial access in accordance with aspects of the present disclosure.

FIG. 12 shows a flowchart illustrating a method 1200 that supports reuse of control channel resource associated with initial access in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may perform an initial access procedure within an initial access bandwidth to obtain access to a cell, the initial access bandwidth including first control channel resources. The operations of 1205 may be performed according to the methods described herein. In some examples, aspects of the operations of 1205 may be performed by an initial access component as described with reference to FIGS. 4 through 7.

At 1210, the UE may receive, after the initial access procedure, a configuration of a downlink BWP for communicating with the cell. The operations of 1210 may be performed according to the methods described herein. In some examples, aspects of the operations of 1210 may be performed by a downlink bandwidth part component as described with reference to FIGS. 4 through 7.

At 1215, the UE may determine whether the downlink BWP includes the initial access bandwidth. The operations of 1215 may be performed according to the methods described herein. In some examples, aspects of the operations of 1215 may be performed by a resource overlap component as described with reference to FIGS. 4 through 7.

At 1220, the UE may monitor for control information within the downlink BWP using second control channel resources that correspond to the first control channel resources, where the monitoring is based on a determination that the downlink BWP contains the initial access bandwidth. The operations of 1220 may be performed according to the methods described herein. In some examples, aspects of the operations of 1220 may be performed by a control resource monitoring component as described with reference to FIGS. 4 through 7.

Figure 13:
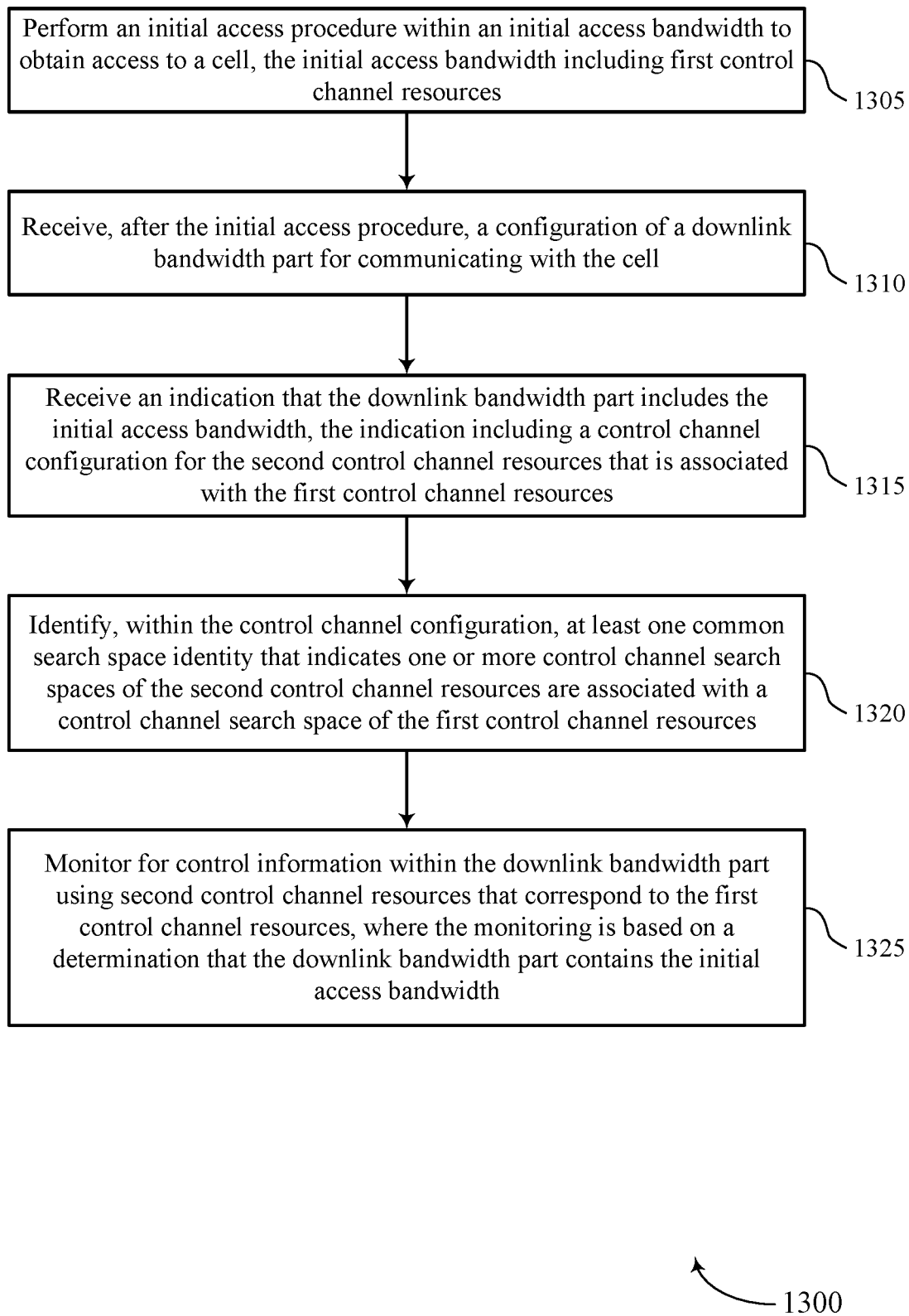

FIG. 13 shows a flowchart illustrating a method 1300 that supports reuse of control channel resource associated with initial access in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may perform an initial access procedure within an initial access bandwidth to obtain access to a cell, the initial access bandwidth including first control channel resources. The operations of 1305 may be performed according to the methods described herein. In some examples, aspects of the operations of 1305 may be performed by an initial access component as described with reference to FIGS. 4 through 7.

At 1310, the UE may receive, after the initial access procedure, a configuration of a downlink BWP for communicating with the cell. The operations of 1310 may be performed according to the methods described herein. In some examples, aspects of the operations of 1310 may be performed by a downlink bandwidth part component as described with reference to FIGS. 4 through 7.

At 1315, the UE may receive an indication that the downlink BWP includes the initial access bandwidth, the indication including a control channel configuration for the second control channel resources that is associated with the first control channel resources. In some cases, the control channel configuration may be a cell-specific control channel configuration for the control channel resources in the downlink BWP. The operations of 1315 may be performed according to the methods described herein. In some examples, aspects of the operations of 1315 may be performed by a resource overlap component as described with reference to FIGS. 4 through 7.

At 1320, the UE may identify, within the control channel configuration, at least one common search space identity that indicates one or more control channel search spaces of the second control channel resources are associated with a control channel search space of the first control channel resources. The operations of 1320 may be performed according to the methods described herein. In some examples, aspects of the operations of 1320 may be performed by a control resource identifier as described with reference to FIGS. 4 through 7.

At 1325, the UE may monitor for control information within the downlink BWP using second control channel resources that correspond to the first control channel resources, where the monitoring is based on a determination that the downlink BWP contains the initial access bandwidth. The operations of 1325 may be performed according to the methods described herein. In some examples, aspects of the operations of 1325 may be performed by a control resource monitoring component as described with reference to FIGS. 4 through 7.

Figure 14:
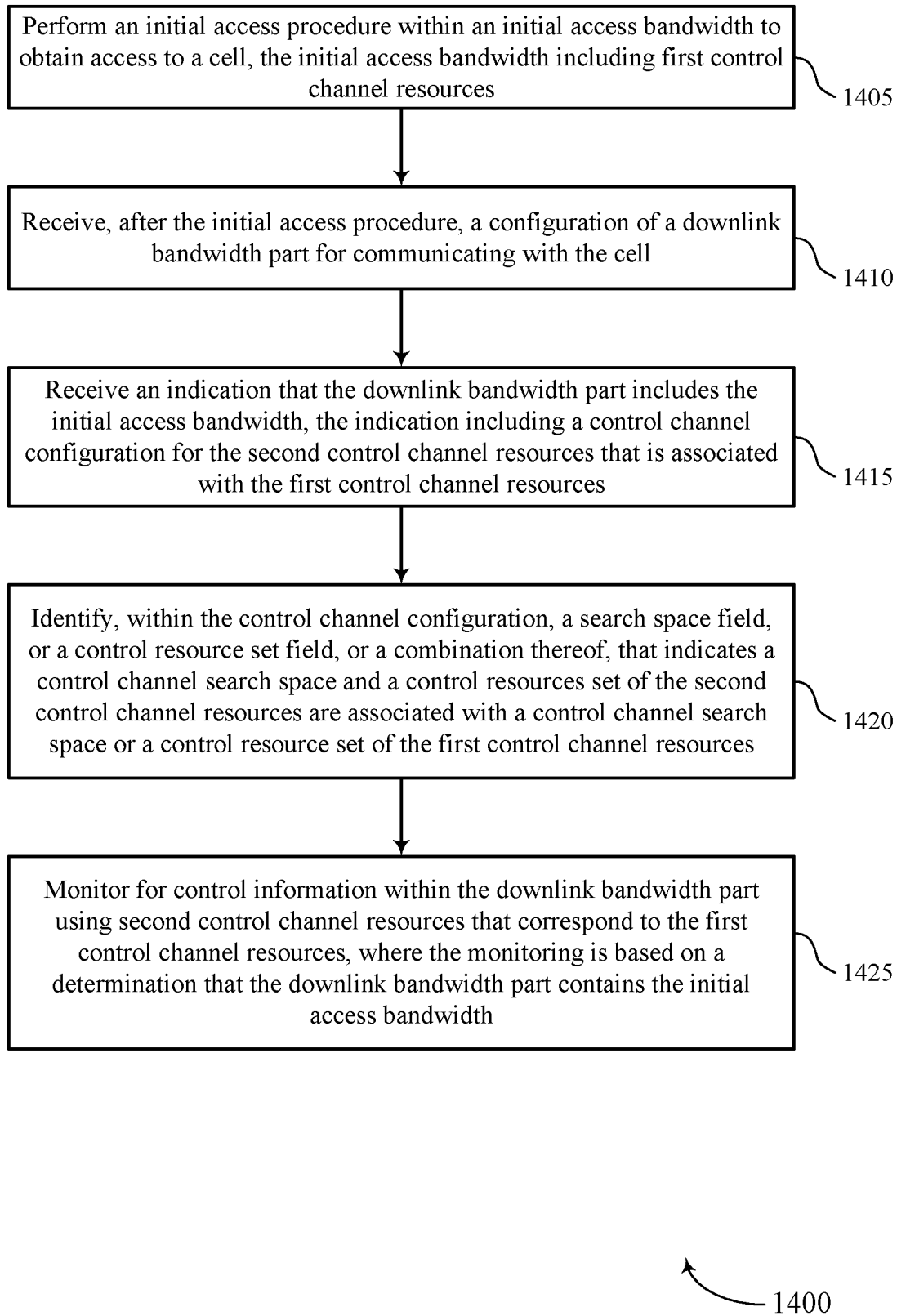

FIG. 14 shows a flowchart illustrating a method 1400 that supports reuse of control channel resource associated with initial access in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may perform an initial access procedure within an initial access bandwidth to obtain access to a cell, the initial access bandwidth including first control channel resources. The operations of 1405 may be performed according to the methods described herein. In some examples, aspects of the operations of 1405 may be performed by an initial access component as described with reference to FIGS. 4 through 7.

At 1410, the UE may receive, after the initial access procedure, a configuration of a downlink BWP for communicating with the cell. The operations of 1410 may be performed according to the methods described herein. In some examples, aspects of the operations of 1410 may be performed by a downlink bandwidth part component as described with reference to FIGS. 4 through 7.

At 1415, the UE may receive an indication that the downlink BWP includes the initial access bandwidth, the indication including a control channel configuration for the second control channel resources that is associated with the first control channel resources. In some cases, the control channel configuration may be a cell-specific control channel configuration for the control channel resources in the downlink BWP. The operations of 1415 may be performed according to the methods described herein. In some examples, aspects of the operations of 1415 may be performed by a resource overlap component as described with reference to FIGS. 4 through 7.

At 1420, the UE may identify, within the control channel configuration, a search space field, or a control resource set field, or a combination thereof, that indicates a control channel search space and a control resource set of the second control channel resources are associated with a control channel search space or a control resource set of the first control channel resources. The operations of 1420 may be performed according to the methods described herein. In some examples, aspects of the operations of 1420 may be performed by a control resource identifier as described with reference to FIGS. 4 through 7.

At 1425, the UE may monitor for control information within the downlink BWP using second control channel resources that correspond to the first control channel resources, where the monitoring is based on a determination that the downlink BWP contains the initial access bandwidth. The operations of 1425 may be performed according to the methods described herein. In some examples, aspects of the operations of 1425 may be performed by a control resource monitoring component as described with reference to FIGS. 4 through 7.

Figure 15:
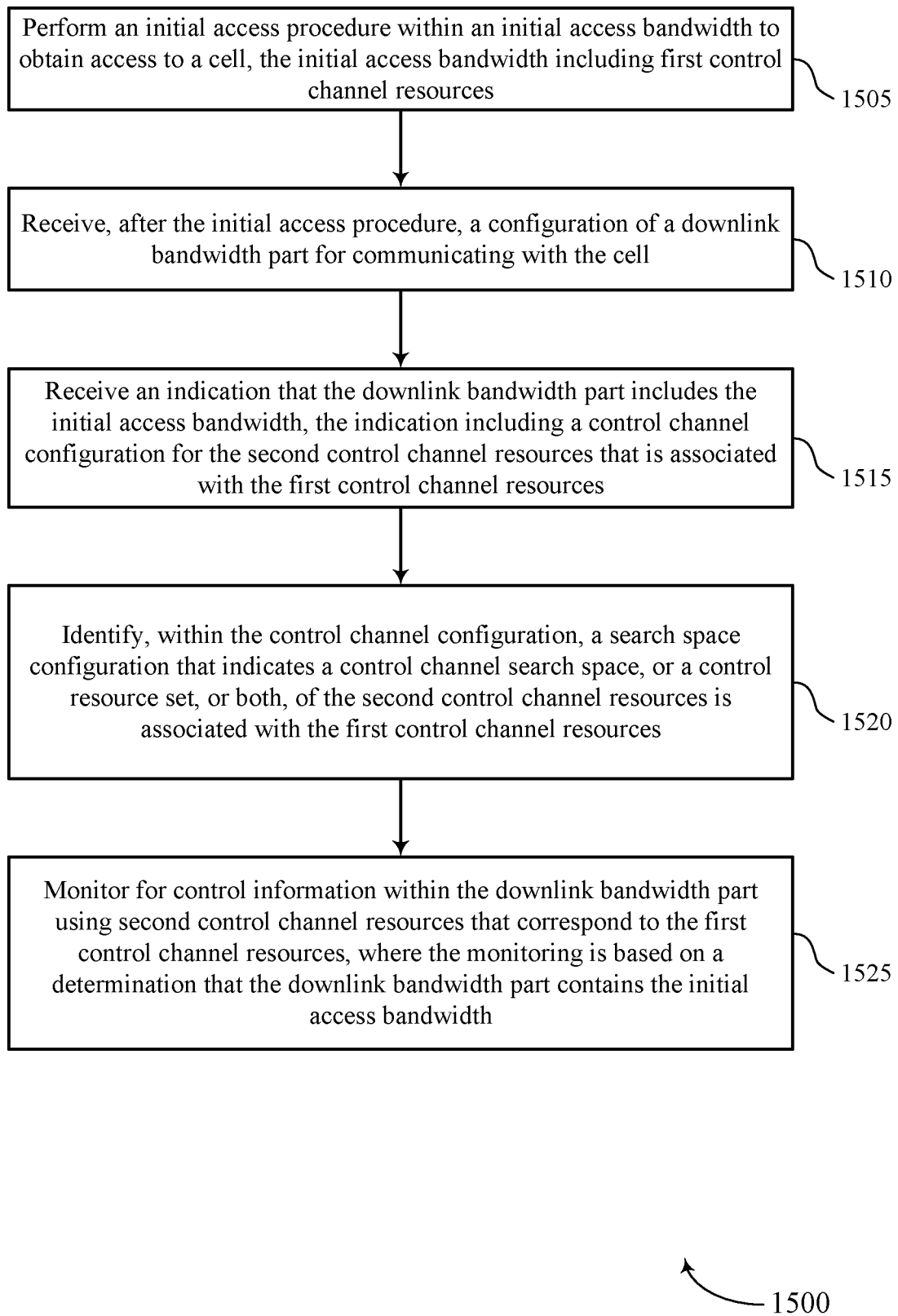

FIG. 15 shows a flowchart illustrating a method 1500 that supports reuse of control channel resource associated with initial access in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1505, the UE may perform an initial access procedure within an initial access bandwidth to obtain access to a cell, the initial access bandwidth including first control channel resources. The operations of 1505 may be performed according to the methods described herein. In some examples, aspects of the operations of 1505 may be performed by an initial access component as described with reference to FIGS. 4 through 7.

At 1510, the UE may receive, after the initial access procedure, a configuration of a downlink BWP for communicating with the cell. The operations of 1510 may be performed according to the methods described herein. In some examples, aspects of the operations of 1510 may be performed by a downlink bandwidth part component as described with reference to FIGS. 4 through 7.

At 1515, the UE may receive an indication that the downlink BWP includes the initial access bandwidth, the indication including a control channel configuration for the second control channel resources that is associated with the first control channel resources. In some cases, the control channel configuration may be a UE-specific control channel configuration for the second control channel resources. The operations of 1515 may be performed according to the methods described herein. In some examples, aspects of the operations of 1515 may be performed by a resource overlap component as described with reference to FIGS. 4 through 7.

At 1520, the UE may identify, within the control channel configuration, a search space configuration that indicates a control channel search space, or a control resource set, or both, of the second control channel resources is associated with the first control channel resources. The operations of 1520 may be performed according to the methods described herein. In some examples, aspects of the operations of 1520 may be performed by a control resource identifier as described with reference to FIGS. 4 through 7.

At 1525, the UE may monitor for control information within the downlink BWP using second control channel resources that correspond to the first control channel resources, where the monitoring is based on a determination that the downlink BWP contains the initial access bandwidth. The operations of 1525 may be performed according to the methods described herein. In some examples, aspects of the operations of 1525 may be performed by a control resource monitoring component as described with reference to FIGS. 4 through 7.

Figure 16:
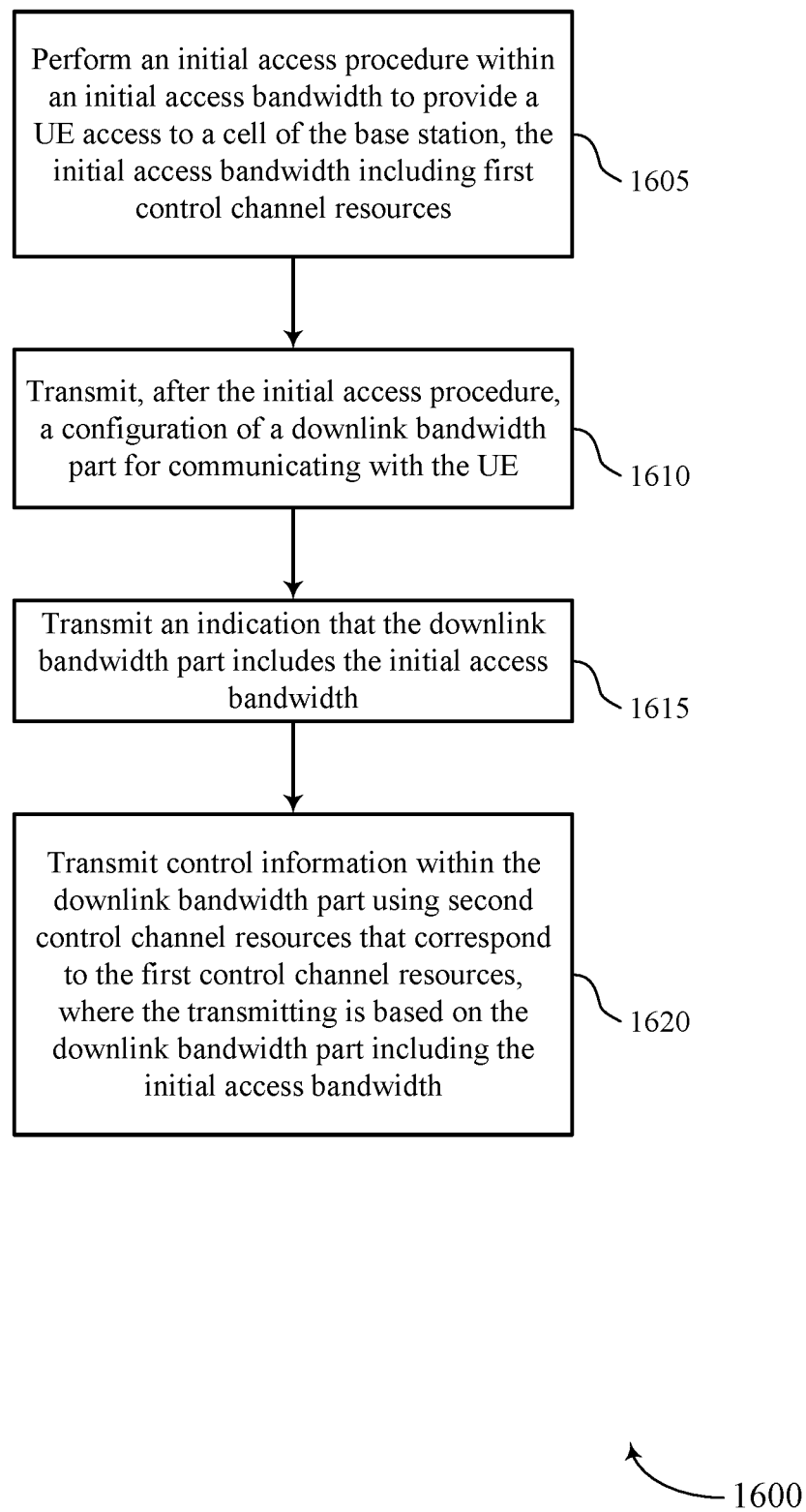

FIG. 16 shows a flowchart illustrating a method 1600 that supports reuse of control channel resource associated with initial access in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may perform an initial access procedure within an initial access bandwidth to provide a UE access to a cell of the base station, the initial access bandwidth including first control channel resources. The operations of 1605 may be performed according to the methods described herein. In some examples, aspects of the operations of 1605 may be performed by an initial access procedure component as described with reference to FIGS. 8 through 11.

At 1610, the base station may transmit, after the initial access procedure, a configuration of a downlink BWP for communicating with the UE. The operations of 1610 may be performed according to the methods described herein. In some examples, aspects of the operations of 1610 may be performed by a bandwidth part configuration manager as described with reference to FIGS. 8 through 11.

At 1615, the base station may transmit an indication that the downlink BWP includes the initial access bandwidth. The operations of 1615 may be performed according to the methods described herein. In some examples, aspects of the operations of 1615 may be performed by a resource overlap manager as described with reference to FIGS. 8 through 11.

At 1620, the base station may transmit control information within the downlink BWP using second control channel resources that correspond to the first control channel resources, where the transmitting is based on the downlink BWP including the initial access bandwidth. The operations of 1620 may be performed according to the methods described herein. In some examples, aspects of the operations of 1620 may be performed by a control information manager as described with reference to FIGS. 8 through 11.

Embodiment 1

A method for wireless communications at a user equipment (UE), comprising: performing an initial access procedure within an initial access bandwidth to obtain access to a cell, the initial access bandwidth comprising first control channel resources; receiving, after the initial access procedure, a configuration of a downlink BWP for communicating with the cell; determining whether the downlink BWP includes the initial access bandwidth; and monitoring for control information within the downlink BWP using second control channel resources that correspond to the first control channel resources, wherein the monitoring is based at least in part on a determination that the downlink BWP contains the initial access bandwidth.

Embodiment 2

The method of embodiment 1, wherein determining that the downlink BWP includes the initial access bandwidth comprises: receiving an indication that the downlink BWP includes the initial access bandwidth, the indication comprising a control channel configuration for the second control channel resources that is associated with the first control channel resources.

Embodiment 3

The method of embodiment 2, identifying, within the control channel configuration, at least one common search space identity that indicates one or more control channel search spaces of the second control channel resources are associated with a control channel search space of the first control channel resources.

Embodiment 4

The method of any of embodiments 2 to 3, wherein the control channel configuration comprises a cell-specific control channel configuration for the second control channel resources.

Embodiment 5

The method of any of embodiments 2 to 4, wherein the at least one common search space identity corresponds to a common control channel search space that is used to convey a system information block, other system information, page information, random access information, or any combination thereof.

Embodiment 6

The method of any of embodiments 2 to 5, further comprising: receiving a master information block; and determining time domain and frequency domain information of the second control channel resources based at least in part on the received master information block.

Embodiment 7

The method of any of embodiments 2 to 6 further comprising: receiving, within the initial access bandwidth, a cell-specific control channel configuration and a UE-specific control channel configuration; and determining time domain and frequency domain information of the second control channel resources based at least in part on the cell-specific control channel configuration or the UE-specific control channel configuration, or both.

Embodiment 8

The method of embodiment 2, further comprising: identifying, within the control channel configuration, a search space field, or a control resource set field, or a combination thereof, that indicates a control channel search space and a control resource set of the second control channel resources are associated with a control channel search space or a control resource set of the first control channel resources.

Embodiment 9

The method of embodiment 8, wherein the control channel configuration comprises a cell-specific control channel configuration for the second control channel resources.

Embodiment 10

The method of any of embodiments 8 to 9, further comprising: receiving a master information block; and determining time domain and frequency domain information of the second control channel resources based at least in part on the master information block, wherein the search space field or the control resource set field comprise information that is consistent with information configured by the master information block.

Embodiment 11

The method of any of embodiments 8 to 10, further comprising: receiving, within the initial access bandwidth, a cell-specific control channel configuration and a UE-specific control channel configuration; and determining time domain and frequency domain information of the second control channel resources based at least in part on the cell-specific control channel configuration or the UE-specific control channel configuration, or both.

Embodiment 12

The method of any of embodiments 2 to 11, further comprising: identifying, within the control channel configuration, a search space configuration that indicates a control channel search space, or a control resource set, or both, of the second control channel resources is associated with the first control channel resources.

Embodiment 13

The method of embodiment 12, wherein the control channel configuration comprises a UE-specific control channel configuration for the second control channel resources.

Embodiment 14

The method of any of embodiments 12 to 13, further comprising: identifying a set of parameters for the second control channel resources using the search space configuration, wherein the set of parameters comprises a search space periodicity, a slot offset, a starting symbol bitmap of a control channel search space, an aggregation level, or any combination thereof.

Embodiment 15

The method of any of embodiments 12 to 14, further comprising: receiving a master information block; and determining time domain and frequency domain information of the second control channel resources, or a set of parameters of the second control channel resources, or a combination thereof, based at least in part on the received master information block.

Embodiment 16

The method of any of embodiments 12 to 15, further comprising: receiving, within the initial access bandwidth, a cell-specific control channel configuration and a UE-specific control channel configuration; and determining time domain and frequency domain information of the second control channel resources, or a set of parameters of the second control channel resources, or a combination thereof, based at least in part on the cell-specific control channel configuration or the UE-specific control channel configuration, or both.

Embodiment 17

The method of any of embodiments 2 to 16, further comprising: identifying, within the control channel configuration, a common search space identity, a search space field, a control resource set field, a search space configuration, or a combination thereof, that indicates the second control channel resources are associated with the first control channel resources.

Embodiment 18

The method of embodiment 17, wherein the control channel configuration comprises a cell-specific control channel configuration or a UE-specific control channel configuration for the second control channel resources.

Embodiment 19

The method of any of embodiments 2 to 18, further comprising: receiving the control channel configuration via radio resource control signaling

Embodiment 20

The method of any of embodiments 1 to 19, wherein the initial access bandwidth and the downlink BWP have a same subcarrier spacing.

Embodiment 21

The method of any of embodiments 1 to 20, wherein the second control channel resources comprise one or more control resource sets, one or more control channel search spaces, or a combination thereof.

Embodiment 22

The method of embodiment 21, wherein at least one of the one or more control resource sets or at least one of the one or more control channel search spaces are used to convey a system information block, other system information, page information, random access information, or a combination thereof.

Embodiment 23

A method for wireless communications at a base station comprising: performing an initial access procedure within an initial access bandwidth to provide a user equipment (UE) access to a cell of the base station, the initial access bandwidth comprising first control channel resources; transmitting, after the initial access procedure, a configuration of a downlink BWP for communicating with the UE; transmitting an indication that the downlink BWP includes the initial access bandwidth; and transmitting control information within the downlink BWP using second control channel resources that correspond to the first control channel resources, wherein the transmitting is based at least in part on the downlink BWP including the initial access bandwidth.

Embodiment 24

The method of embodiment 23, wherein the indication that the downlink BWP includes the initial access bandwidth comprises a control channel configuration for the second control channel resources that is associated with the first control channel resources.

Embodiment 25

The method of embodiment 24, further comprising: configuring, within the control channel configuration, at least one common search space identity that indicates one or more control channel search spaces of the second control channel resources are associated with a control channel search space of the first control channel resources.

Embodiment 26

The method of embodiment 25, wherein the control channel configuration comprises a cell-specific control channel configuration for the second control channel resources.

Embodiment 27

The method of any of embodiments 25 to 26, wherein the at least one common search space identity corresponds to a common search space that is used to convey a system information block, other system information, page information, random access information, or any combination thereof.

Embodiment 28

The method of any of embodiments 25 to 27, further comprising: transmitting a master information block that indicates time domain and frequency domain information of the second control channel resources

Embodiment 29

The method of any of embodiments 25 to 28, further comprising: transmitting, within the initial access bandwidth, a cell-specific control channel configuration and a UE-specific control channel configuration, wherein the cell-specific control channel configuration or the UE-specific control channel configuration, or both, indicate time domain and frequency domain information of the second control channel resources.

Embodiment 30

The method of any of embodiments 24 to 29, further comprising: configuring, within the control channel configuration, a search space field, or a control resource set field, or a combination thereof, that indicates a control channel search space and a control resource set of the second control channel resources are associated with a control channel search space or a control resource set of the first control channel resources.

Embodiment 31

The method of embodiment 30, wherein the control channel configuration comprises a cell-specific control channel configuration for the second control channel resources.

Embodiment 32

The method of any of embodiments 30 to 31, further comprising: transmitting a master information block that indicates time domain and frequency domain information of the second control channel resources, wherein the search space field or the control resource set field comprise information that is consistent with information configured by the master information block.

Embodiment 33

The method of any of embodiments 30 to 32, further comprising: transmitting, within the initial access bandwidth, a cell-specific control channel configuration and a UE-specific control channel configuration, wherein the cell-specific control channel configuration or the UE-specific control channel configuration, or both, indicate time domain and frequency domain information of the second control channel resources.

Embodiment 34

The method of any of embodiments 24 to 33, further comprising: configuring, within the control channel configuration, a search space configuration that indicates a control channel search space, or a control resource set, or both, of the second control channel resources is associated with the first control channel resources.

Embodiment 35

The method of embodiment 34, wherein the control channel configuration comprises a UE-specific control channel configuration for the second control channel resources.

Embodiment 36

The method of any of embodiments 34 to 35, further comprising: configuring, within the search space configuration, a set of parameters for the second control channel resources, wherein the set of parameters comprises a search space periodicity, a slot offset, a starting symbol bitmap of a control channel search space, an aggregation level, or any combination thereof.

Embodiment 37

The method of any of embodiments 34 to 36, further comprising: transmitting a master information block that indicates time domain and frequency domain information of the second control channel resources, or a set of parameters of the second control channel resources, or a combination thereof.

Embodiment 38

The method of any of embodiments 34 to 37, transmitting, within the initial access bandwidth, a cell-specific control channel configuration and a UE-specific control channel configuration, wherein the cell-specific control channel configuration or the UE-specific control channel configuration, or both, indicate time domain and frequency domain information of the second control channel resources, or a set of parameters of the second control channel resources, or a combination thereof.

Embodiment 39

The method of any of embodiments 24 to 38, further comprising: configuring, within the control channel configuration, a common search space identity, a search space field, a control resource set field, a search space configuration, or a combination thereof, that indicates the second control channel resources are associated with the first control channel resources Embodiment 40

The method of embodiment 39, wherein the control channel configuration comprises a cell-specific control channel configuration or a UE-specific control channel configuration for the second control channel resources.

Embodiment 41

The method of any of embodiments 24 to 40, further comprising: transmitting the control channel configuration via radio resource control signaling Embodiment 42

The method of any of embodiments 23 to 41, wherein the initial access bandwidth and the downlink BWP have a same subcarrier spacing.

Embodiment 43

The method of any of embodiments 23 to 41, wherein the second control channel resources comprise one or more control resource sets, one or more control channel search spaces, or a combination thereof.

Embodiment 44

The method of embodiment 43, wherein at least one of the one or more control resource sets or at least one of the one or more control channel search spaces are used to convey a system information block, other system information, page information, random access information, or a combination thereof.

Embodiment 45

An apparatus for wireless communications comprising a processor; memory in electronic communication with the processor; and instructions stored in the memory and executable by the processor to cause the apparatus to perform a method of any of embodiments 1 to 22.

Embodiment 46

An apparatus for wireless communications comprising a processor; memory in electronic communication with the processor; and instructions stored in the memory and executable by the processor to cause the apparatus to perform a method of any of embodiments 23 to 44.

Embodiment 47

An apparatus comprising at least one means for performing a method of any of embodiments 1 to 22.

Embodiment 48

An apparatus comprising at least one means for performing a method of any of embodiments 23 to 44.

Embodiment 49

A non-transitory computer-readable medium storing code for wireless communication by a UE, the code comprising instructions executable by a processor to cause the processor to perform a method of any of embodiments 1 to 22.

Embodiment 50

A non-transitory computer-readable medium storing code for wireless communication by a base station, the code comprising instructions executable by a processor to cause the processor to perform a method of any of embodiments 23 to 44.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    performing an initial access procedure within an initial access bandwidth to obtain access to a cell, the initial access bandwidth comprising first control channel resources;
    receiving, after the initial access procedure, a configuration of a downlink bandwidth part for communicating with the cell and a control channel configuration comprising one or more fields indicating that the downlink bandwidth part includes the initial access bandwidth; and
    monitoring for control information within the downlink bandwidth part using second control channel resources that correspond to the first control channel resources, wherein the monitoring is based at least in part on a determination that the downlink bandwidth part contains the initial access bandwidth.

2. The method of claim 1, further comprising:
    receiving an indication that the downlink bandwidth part includes the initial access bandwidth, the indication comprising the control channel configuration, wherein the control channel configuration is for the second control channel resources and is associated with the first control channel resources; and
    identifying, within the control channel configuration, at least one common search space identity that indicates one or more control channel search spaces of the second control channel resources are associated with a control channel search space of the first control channel resources.

3. The method of claim 2, further comprising:
    receiving a master information block; and
    determining time domain and frequency domain information of the second control channel resources based at least in part on the received master information block.

4. The method of claim 2, further comprising:
    receiving, within the initial access bandwidth, a cell-specific control channel configuration and a UE-specific control channel configuration; and
    determining time domain and frequency domain information of the second control channel resources based at least in part on the cell-specific control channel configuration or the UE-specific control channel configuration, or both.

5. The method of claim 1, further comprising:
identifying, within the control channel configuration, a search space field, or a control resource set field, or a combination thereof, that indicates a control channel search space and a control resource set of the second control channel resources are associated with a control channel search space or a control resource set of the first control channel resources.

6. The method of claim 5, wherein the control channel configuration comprises a cell-specific control channel configuration for the second control channel resources.

7. The method of claim 5, further comprising:
receiving, within the initial access bandwidth, a cell-specific control channel configuration and a UE-specific control channel configuration; and
determining time domain and frequency domain information of the second control channel resources based at least in part on the cell-specific control channel configuration or the UE-specific control channel configuration, or both.

8. The method of claim 1, further comprising:
identifying, within the control channel configuration, a search space configuration that indicates a control channel search space, or a control resource set, or both, of the second control channel resources is associated with the first control channel resources.

9. The method of claim 8, wherein the control channel configuration comprises a UE-specific control channel configuration for the second control channel resources.

10. The method of claim 8, further comprising:
receiving a master information block; and
determining time domain and frequency domain information of the second control channel resources, or a set of parameters of the second control channel resources, or a combination thereof, based at least in part on the received master information block.

11. The method of claim 8, further comprising:
receiving, within the initial access bandwidth, a cell-specific control channel configuration and a UE-specific control channel configuration; and
determining time domain and frequency domain information of the second control channel resources, or a set of parameters of the second control channel resources, or a combination thereof, based at least in part on the cell-specific control channel configuration or the UE-specific control channel configuration, or both.

12. The method of claim 1, further comprising:
identifying, within the control channel configuration, a common search space identity, a search space field, a control resource set field, a search space configuration, or a combination thereof, that indicates the second control channel resources are associated with the first control channel resources.

13. The method of claim 12, wherein the control channel configuration comprises a cell-specific control channel configuration or a UE-specific control channel configuration for the second control channel resources.

14. The method of claim 1, wherein receiving the control channel configuration comprises:
receiving the control channel configuration via radio resource control signaling.

15. The method of claim 1, wherein the initial access bandwidth and the downlink bandwidth part have a same subcarrier spacing.

16. The method of claim 1, wherein the second control channel resources comprise one or more control resource sets, one or more control channel search spaces, or a combination thereof.

17. A method for wireless communication by a base station, comprising:
performing an initial access procedure within an initial access bandwidth to provide a user equipment (UE) access to a cell of the base station, the initial access bandwidth comprising first control channel resources;
transmitting, after the initial access procedure, a configuration of a downlink bandwidth part for communicating with the UE and a control channel configuration comprising one or more fields indicating that the downlink bandwidth part includes the initial access bandwidth; and
transmitting control information within the downlink bandwidth part using second control channel resources that correspond to the first control channel resources, wherein the transmitting is based at least in part on the downlink bandwidth part including the initial access bandwidth.

18. The method of claim 17, wherein the one or more fields indicating that the downlink bandwidth part includes the initial access bandwidth further comprise:
at least a portion of the control channel configuration, wherein the control channel configuration is for the second control channel resources and is associated with the first control channel resources; and
at least one common search space identity that indicates one or more control channel search spaces of the second control channel resources are associated with a control channel search space of the first control channel resources.

19. The method of claim 18, further comprising:
transmitting a master information block that indicates time domain and frequency domain information of the second control channel resources.

20. The method of claim 18, further comprising:
transmitting, within the initial access bandwidth, a cell-specific control channel configuration and a UE-specific control channel configuration, wherein the cell-specific control channel configuration or the UE-specific control channel configuration, or both, indicate time domain and frequency domain information of the second control channel resources.

21. The method of claim 17, further comprising:
configuring, within the control channel configuration, a search space field, or a control resource set field, or a combination thereof, that indicates a control channel search space and a control resource set of the second control channel resources are associated with a control channel search space or a control resource set of the first control channel resources.

22. The method of claim 21, wherein the control channel configuration comprises a cell-specific control channel configuration for the second control channel resources.

23. The method of claim 21, further comprising:
transmitting, within the initial access bandwidth, a cell-specific control channel configuration and a UE-specific control channel configuration, wherein the cell-specific control channel configuration or the UE-specific control channel configuration, or both, indicate time domain and frequency domain information of the second control channel resources.

24. The method of claim 17, further comprising:
configuring, within the control channel configuration, a search space configuration that indicates a control channel search space, or a control resource set, or both, of the second control channel resources is associated with the first control channel resources.

25. The method of claim 24, wherein the control channel configuration comprises a UE-specific control channel configuration for the second control channel resources.

26. The method of claim 24, further comprising:
transmitting a master information block that indicates time domain and frequency domain information of the second control channel resources, or a set of parameters of the second control channel resources, or a combination thereof.

27. The method of claim 24, further comprising:
transmitting, within the initial access bandwidth, a cell-specific control channel configuration and a UE-specific control channel configuration, wherein the cell-specific control channel configuration or the UE-specific control channel configuration, or both, indicate time domain and frequency domain information of the second control channel resources, or a set of parameters of the second control channel resources, or a combination thereof.

28. The method of claim 17, further comprising:
configuring, within the control channel configuration, a common search space identity, a search space field, a control resource set field, a search space configuration, or a combination thereof, that indicates the second control channel resources are associated with the first control channel resources.

29. An apparatus for wireless communication by a user equipment (UE), comprising:
a processor,
memory in electronic communication with the processor; and
instructions stored in the memory and executable by the processor to cause the apparatus to:
perform an initial access procedure within an initial access bandwidth to obtain access to a cell, the initial access bandwidth comprising first control channel resources;
receive, after the initial access procedure, a configuration of a downlink bandwidth part for communicating with the cell and a control channel configuration comprising one or more fields indicating that the downlink bandwidth part includes the initial access bandwidth; and
monitor for control information within the downlink bandwidth part using second control channel resources that correspond to the first control channel resources, wherein the monitoring is based at least in part on a determination that the downlink bandwidth part contains the initial access bandwidth.

30. An apparatus for wireless communication by a base station, comprising:
a processor,
memory in electronic communication with the processor; and
instructions stored in the memory and executable by the processor to cause the apparatus to:
perform an initial access procedure within an initial access bandwidth to provide a user equipment (UE) access to a cell of the base station, the initial access bandwidth comprising first control channel resources;
transmit, after the initial access procedure, a configuration of a downlink bandwidth part for communicating with the UE and a control channel configuration comprising one or more fields indicating that the downlink bandwidth part includes the initial access bandwidth; and
transmit control information within the downlink bandwidth part using second control channel resources that correspond to the first control channel resources, wherein the transmitting is based at least in part on the downlink bandwidth part including the initial access bandwidth.

* * * * *